(12) United States Patent
Wang et al.

(10) Patent No.: US 8,217,812 B2
(45) Date of Patent: Jul. 10, 2012

(54) ADJUSTABLE SAMPLING RATE CONVERTER

(75) Inventors: Song Wang, San Diego, CA (US); Aris Balatsos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 12/774,398

(22) Filed: May 5, 2010

(65) Prior Publication Data

US 2011/0224996 A1 Sep. 15, 2011

Related U.S. Application Data

(60) Provisional application No. 61/312,861, filed on Mar. 11, 2010.

(51) Int. Cl.
*H03M 7/00* (2006.01)
(52) U.S. Cl. .......... 341/61; 341/123; 341/155; 375/316; 375/353; 375/371; 375/372; 370/313; 370/543
(58) Field of Classification Search ................ 341/61, 341/123, 155; 375/316, 355, 371, 372; 370/313, 370/543
See application file for complete search history.

(56) References Cited

U.S. PATENT DOCUMENTS

| | | | |
|---|---|---|---|
| 5,475,628 A | 12/1995 | Adams et al. | |
| 6,057,789 A * | 5/2000 | Lin | 341/61 |
| 6,061,410 A | 5/2000 | Linz | |
| 6,226,661 B1 | 5/2001 | Savell | |
| 6,249,235 B1 * | 6/2001 | Iwasaki | 341/123 |
| 6,324,235 B1 | 11/2001 | Savell et al. | |
| 6,856,266 B2 * | 2/2005 | Clement et al. | 341/143 |
| 7,061,409 B1 * | 6/2006 | Jantti et al. | 341/61 |
| 7,106,224 B2 * | 9/2006 | Knapp et al. | 341/61 |
| 7,158,045 B1 * | 1/2007 | Gudmunson et al. | 348/515 |
| 7,236,110 B2 | 6/2007 | Antonesei | |
| 7,298,296 B1 * | 11/2007 | Kamath | 341/61 |
| 7,414,550 B1 * | 8/2008 | Sudharsanan | 341/61 |
| 7,528,745 B2 | 5/2009 | Wang et al. | |
| 7,970,088 B2 * | 6/2011 | Chieng et al. | 375/355 |
| 2004/0032350 A1 * | 2/2004 | Knapp et al. | 341/61 |
| 2005/0184889 A1 * | 8/2005 | Avantaggiati | 341/61 |
| 2006/0009983 A1 | 1/2006 | Magliaro et al. | |
| 2007/0165762 A1 * | 7/2007 | Darr et al. | 375/372 |
| 2009/0190701 A1 * | 7/2009 | Nekhamkin et al. | 375/355 |

OTHER PUBLICATIONS

International Search Report and Written Opinion—PCT/US2011/028228—ISA/EPO—Aug. 30, 2011.
Smith J O et al: "A Flexible Sampling-Rate Conversion Method", International Conference on Acoustics, Speech & Signal Processing. ICASSP. San Diego, Mar. 19-21, 1984; [International Conference on Acoustics, Speech & Signal Processing. ICASSP], New York, IEEE , US, vol. 2, Mar. 1, 1984, pp. 19.4.01-19.4.04, XP000946290, the whole document.

* cited by examiner

*Primary Examiner* — Linh Nguyen
(74) *Attorney, Agent, or Firm* — Espartaco Diaz Hidalgo

(57) ABSTRACT

Techniques of this disclosure provide for adjustment of a conversion rate of a sampling rate converter (SRC) in real-time. The SRC determines relative timing of generated output samples based on non-approximated integer components that are recursively updated. The SRC may further base relative timing of output samples on a value of one or more step size components associated with the integer components. Also according to techniques of this disclosure, a conversion rate of an SRC may be adjusted in real-time based on a detected mismatch between a source clock of a digital input signal and a local clock.

66 Claims, 11 Drawing Sheets

ADJUSTABLE SAMPLING RATE CONVERTER

This application claims the benefit of U.S. Provisional Application No. 61/312,861, filed Mar. 11, 2010, which is hereby incorporated by reference in its entirety.

TECHNICAL FIELD

This disclosure relates to digital signal processing and, more specifically, this invention relates to conversion of a sampling rate of a digital input signal.

BACKGROUND

In signal processing applications, a sampling rate (also known as sample rate or sampling frequency) defines the number of samples per second (or other unit) taken from a continuous signal to make a discrete signal. In some applications, it is desirable to modify a sampling rate of a digital signal. For example, audio may be recorded at a first sampling rate to create a digital representation of the audio, and a device (e.g. a CD player, mp3 player, or the like) may output audible sounds based on the digital representation at a second sampling rate. In this scenario, the first sampling rate of the digital representation may need to be converted to the second sampling rate expected by the device. In another example, where a device may be used to overlay or simultaneously output an audible sound based on two or more digital representations, sampling rates of the two or more digital representations may need to be matched for simultaneous playback.

In order to convert a sampling rate of a digital signal, many electronics devices employ one or more sampling rate converters (SRC). An SRC receives a digital input signal, up and/or down-converts the signal, and outputs a digital output signal with an adjusted sampling rate. Typical SRCs employ a static conversion ratio regardless of a sampling rate of digital input or output signals.

Streaming of data, such as an audio data signal, has become commonplace in many electronics applications. For example, instead of playing stored music, many systems and devices are operable to transmit a digital signal which is then played back as it is received by a device, such as a mobile device. In streaming applications, it may be important to synchronize a clock of the incoming signal with a clock of the device on which the signal is received. For example, a mobile device may receive a radio or other signal at a first clock rate, while the mobile device itself may operate on a second, different clock rate based on a clock local to the mobile device. If these clocks are out of sync, playback quality of the digital signal (e.g. audio playback of an audio signal), may suffer.

In order to synchronize a clock of a received digital signal to a local clock, many electronics devices employ one or more highly accurate clock generating devices or modules, for example a phase lock loop (PLL), to generate the local clock. A PLL may output a highly stable clock signal for synchronization. However a PLL may be expensive, take up a large amount of available space within a device, and/or consume a large amount of power relative to other electronics components. A highly accurate clock signal may be utilized as a reference to synchronize an incoming data signal. The highly accurate clock may also be utilized as a reference for other circuitry, such as a digital-to-analog converter that is utilized to convert a received digital signal to a useable form, e.g. an analog waveform that may be output as audible sound.

SUMMARY

The techniques of this disclosure provide for improvements in conversion of a sampling rate of an input signal to produce an output signal at a different sampling rate. The techniques of this disclosure allow for the adjustment of a conversion rate of a sampling rate converter in real-time, or on a per sample basis. The techniques of this disclosure further provide for the real-time adjustment of a conversion rate based on a detected clock rate mismatch between a source clock of an input signal and a local clock. In one example, a method is described herein. The method includes receiving at least one input sample of an input signal. The method further includes generating a phase difference signal based on comparison of a source clock of the input signal to a local clock. The method includes compensating for a detected clock rate mismatch indicated by the phase difference signal, wherein compensating for the detected clock mismatch includes adjusting a conversion rate of at least one output sample of a plurality of output samples based on the phase difference signal.

In another example, a sample rate converter is described herein. The sample rate converter includes an up-sampling module that converts a sampling rate of an input signal to an intermediate sampling rate. The sample rate converter further includes a down-sampling module that converts a sampling rate of an intermediate signal to an output sampling rate. The sample rate converter further includes a phase tracking module that determines a relative timing of output samples of an output signal of the up-sampling module. The sample rate converter further includes a clock rate mismatch detector that determine a clock rate mismatch between a source clock of the input signal and a local clock, wherein the phase tracking module adjusts a conversion rate of at least one sample of a plurality of output samples of the up-sampling module based on the clock rate mismatch.

In another example, a computer readable storage medium comprising instructions is described herein. The instructions cause a programmable processor to receive at least one input sample of an input signal. The instructions further cause the programmable processor to generate a phase difference signal based on comparison of a source clock of the input signal to a local clock. The instructions further cause the programmable processor to compensate for a detected clock rate mismatch indicated by the phase difference signal including adjusting a conversion rate of at least one sample of a plurality of output samples based on the phase difference signal.

In another example, a sample rate converter is described herein. The sample rate converter includes means for converting a sampling rate of an input signal to an intermediate sampling rate. The sample rate converter further includes means for converting a sampling rate of an intermediate signal at the intermediate sampling rate to an output sampling rate. The sample rate converter further includes means for determining a relative timing of output samples of an output signal of the means for converting a sampling rate of an input signal to an intermediate sampling rate. The sample rate converter further includes means for detecting a clock rate mismatch between a source clock of the input signal and a local clock, wherein the means for determining a relative timing of output samples of an output signal adjust a conversion rate of at least one output sample of a plurality of output samples of the means for converting a sampling rate of an input signal to an intermediate sampling rate based on the clock rate mismatch.

In another example, method of adjusting a conversion rate of an input signal from an input sampling rate to an output sampling rate is described herein. The method includes determining at least one step size value for a plurality of non-approximated integer components that represent relative timing of output samples of an output signal based on timing of one or more input samples of the input signal. The method further includes incrementally updating the plurality of non-approximated integer components based on the at least one step size value. The method further includes determining at least one step size adjustment component associated with the plurality of non-approximated integer components, wherein the at least one step size adjustment component identifies a desired adjustment to relative timing of output samples of the output signal. The method further includes adjusting a relative timing of at least one output sample of the output signal based on the at least one step size adjustment component.

In another example, an up-sampler is described herein. The up-sampler includes a phase tracking module that determines at least one step size value for a plurality of non-approximated integer components that represent relative timing of output samples of the up-sampler based on timing of one or more input samples of an input signal. The phase tracking module incrementally updates the plurality of non-approximated integer components based on the at least one step size value. The phase tracking module determines at least one step size adjustment component associated with the plurality of non-approximated integer components, wherein the at least one step size adjustment component identifies a desired adjustment to relative timing of output samples of the output signal. The phase tracking module adjusts a relative timing of at least one output sample of the output signal based on the at least one step size adjustment component.

In another example, an up-sampler is described herein. The up-sampler includes means for determining at least one step size value for a plurality of non-approximated integer components that represent relative timing of output samples of the up-sampler based on timing of one or more input samples of an input signal. The up-sampler further includes means for incrementally updating the plurality of non-approximated integer components based on the at least one step size value. The up-sampler further includes means for determining at least one step size adjustment component associated with the plurality of non-approximated integer components. The at least one step size adjustment component identifies a desired adjustment to relative timing of output samples of the output signal. The up-sampler further includes means for adjusting a relative timing of at least one output sample of the output signal based on the at least one step size adjustment component.

In another example, a computer readable storage medium comprising instructions is described herein. The computer readable storage medium includes instructions to cause a programmable processor to determine at least one step size value for a plurality of non-approximated integer components that represent relative timing of output samples of an output signal based on timing of one or more input samples of the input signal. The computer readable storage medium further includes instructions to cause a programmable processor to incrementally update the plurality of non-approximated integer components based on the at least one step size value. The computer readable storage medium further includes instructions to cause the programmable processor to determine at least one step size adjustment component associated with the plurality of non-approximated integer components. The at least one step size adjustment component identifies a desired adjustment to relative timing of output samples of the output signal. The computer readable storage medium further includes instructions to cause the programmable processor to adjust a relative timing of at least one output sample of the output signal based on the at least one step size adjustment component.

DETAILED DESCRIPTION

Figure 1:
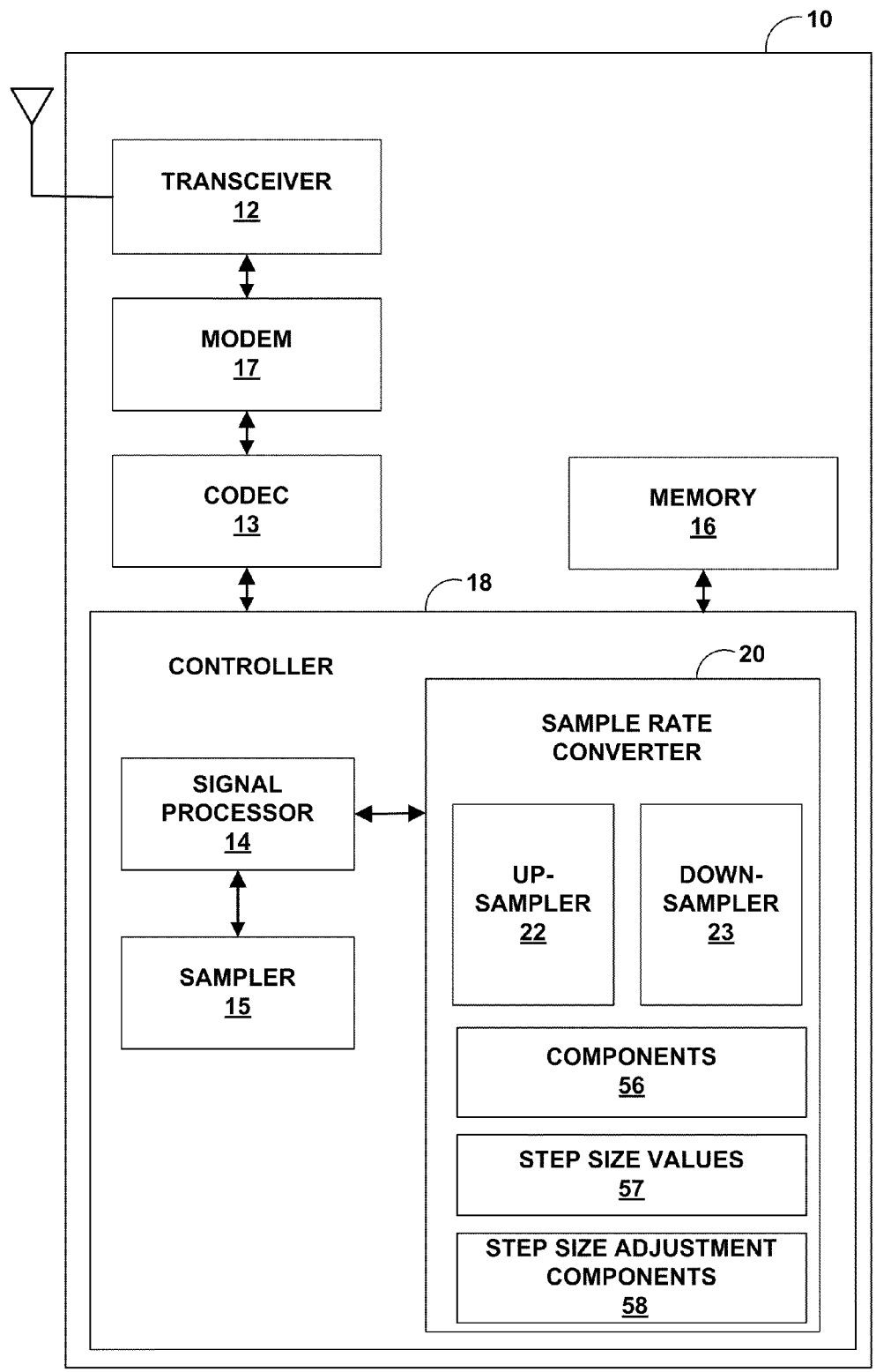
FIG. 1 is a block diagram illustrating one example of a device that includes a sample rate converter (SRC) consistent with this disclosure.

Determination of a relative timing between input and output samples can be critical to the performance of a sampling rate converter. Inaccurate determination of relative timing can result in reconstruct distortion and/or frequency skew in an output signal. This disclosure describes techniques for accurately modifying a conversion ratio of a sampling rate converter in real-time.

Conventionally, sampling rate converters determine output samples of an output signal as a function of a conversion rate and input samples of an input signal. The conversion rate may be a fractional number represented by the ratio ($f_{o\text{-}src}/f_i$) between a desired output sampling frequency of the sample rate converter $f_{o\text{-}src}$ and an input sampling frequency $f_i$. For example, if a signal is being up-converted from 12 kHz to 48 kHz, the conversion rate would be 4. If the sampling rate converter is operating at a conversion rate of 4, the sampling rate converter may output four output samples for every input sample.

A traditional sampling rate converter may generate output samples with a relative timing based on a timing of received input samples. For an exemplary conversion rate of 4, a sampling rate converter may generate a first output sample at a time when a first input sample is received. The sampling rate converter may also generate an output sample ¼ of the way between a first input sample and a second input sample, ½ way between the first and second input samples, and ¾ of the way between the first and second input samples.

Sample rate converters may be formed of an up-sampler module that converts an input sampling rate $f_i$ to an arbitrary intermediate sampling rate $f_o$, and a down-sampler module that converts a signal at the intermediate sampling rate $f_o$ to an output signal at a desired output sampling rate $f_{o\text{-}src}$. A timing of each subsequent output sample may be obtained by incrementing a relative timing of a previous output sample.

A conversion rate may be a fractional number. A traditional sampling rate converter may represent the timing of output samples using a finite number of binary digits. A sampling rate converter may precisely represent finite fractional numbers, such as ½, ¾, and $^{127}/_{128}$, with the finite number of binary digits. However, in some circumstances, a conversion rate may result in a conversion rate represented by infinite fractional numbers, such as ⅓, $^4/_7$, $^{480}/_{441}$. In such circumstances, a traditional sampling rate converter may quantize (e.g., approximate to a non-infinite fractional number) an infinite fractional number such that it may be represented within a finite number of binary digits. Approximating infinite fractional numbers by quantization may introduce error in the sampling rate conversion process. The error may accrue over time, because each time a subsequent output sample is incremented by an approximated infinite fractional number, the location of the output sample relative to the input sample may be slightly off due to the quantization. Where the converted input digital signal represents audio data, quantization may cause audible artifacts in an output audio signal, or audio playback may be disrupted entirely. In order to reduce an amount of error in the sample rate conversion process, techniques of this disclosure provide a more accurate way to determine a relative timing of samples of an output signal. The techniques of this disclosure provide a way to represent timing of generated samples using components based on non-approximated integer numbers. As used herein, the phrase "non-approximated integer number" refers to an integer number that is not obtained by rounding, quantizing or otherwise approximating an infinite number. Tracking the timing of the output signal based on non-approximated integer numbers may allow a sample rate converter to more accurately convert a sampling rate of an input signal by reducing the errors caused by approximation of infinite fractional numbers. Also according to techniques of this disclosure, a conversion rate of a sampling rate converter may be adjusted in real-time, by controlling one or more step size components associated with the above-described non-approximated integer number components.

In some digital signal processing applications, either an input sampling rate or an output sampling rate may change while the sampling rate converter is operating to convert a sampling rate of the input sample. For example, in some applications, it may be desirable to modify, during real-time, a conversion rate based on a change in an output sampling rate expected downstream. In one such example, where a user is listening to music on a mobile device that enables both digital audio playback (e.g., music playback) and telephone voice communications, a user may be listening to music on the device. A sampling rate converter of the device may convert a sampling rate of the music to a sampling rate for playback, e.g., 44.1 kHz. The device may also output an audio signal for voice communications (telephone) at a second sampling rate different than the first sampling rate for music playback, e.g., 8 kHz. Using sampling rate conversion techniques described herein, the device may change a conversion rate such that the music audio signal is now output at a sampling rate of 8 kHz, so that the music may continue to play on the device while the user is on a call. According to techniques of this disclosure, the conversion rate of a sampling rate converter may be modified in real-time based on modification of step size components associated with non-approximated integer components used to determine timing of output samples of the digital output signal, such that the music audio signal may be seamlessly played while the user is receiving the voice audio signal. In some examples according to techniques of this disclosure, a conversion rate of a sampling rate converter may be modified on a per sample basis or over a range of samples, thus allowing improved control over a conversion rate to change in real-time. In other examples, it may be advantageous to modify a sampling rate conversion ratio based on a change in an input sampling rate of a digital input signal. For example, a device may receive a first digital input signal at a first frequency, and a second digital input signal at a second frequency, e.g., where the source of the digital input signal changes such as from a compact disc (CD) sampled at 44.1 kHz, to a voice signal sampled at 8 kHz. According to techniques of this disclosure, a conversion rate of a sampling rate converter may be modified based on modification of one or more step size components associated with non-approximated components. Adjustment of a conversion rate may allow for a seamless transition between the first and second digital input signals at different sampling rates.

In still other examples, a sample rate conversion according to techniques of this disclosure may enable accurate sample rate conversion without a highly accurate clock. According to these techniques, as discussed in further detail below, a sampling rate of an input signal may be modified based on detection of a mismatch between a local clock and an input clock of an input signal.

FIG. 1 is a block diagram illustrating a wireless communication device (WCD) 10 that determines a relative timing between desired output samples and corresponding input samples of a digital signal using non-approximated integer components in accordance with the techniques described in this disclosure. WCD 10 may take the form of a mobile telephone, smart phone, a satellite telephone, a wireless communication card incorporated within a portable computer, a personal digital assistant (PDA) equipped with wireless communication capabilities, or any of a variety of devices capable of wireless communication. The techniques of this disclosure are described in the context of wireless communication devices for exemplary purposes only. The techniques may also be useful in other devices, including wired communication devices, packet based communication devices, and devices such as audio or video playback devices, recording devices, display devices, video gaming devices, or other devices that are not principally directed to communication.

WCD 10 may communicate with a plurality of base stations (not shown). Base stations are generally stationary equipment that wirelessly communicates with WCD 10 in order to provide network access to WCD 10. For example, a base station may provide an interface between WCD 10 and a public switched telephone network (PSTN) such that telephone calls can be routed to and from WCD 10. Alternatively, or additionally, a base station may be coupled to a packet-based network for transmission of packet-based voice information or packet-based data, for example a cellular network.

In the example of FIG. 1, WCD 10 includes an antenna 11, a transceiver 12, a codec (encoder/decoder) 13, a memory 16, and a controller 18. WCD 10 may receive wireless signals from one or more base stations with transceiver 12 via an antenna 11. Codec 13 may decode received wireless signals. Controller 18 may receive digital signals at an input sampling rate from codec 13, process the digital signals, and provide the processed signals to a user of WCD 10 and/or store the processed signals in memory 16.

Controller 18 includes a signal processor 14, a sampler 15, and a sampling rate converter 20. Signal processor 14 processes a digital signal received from codec 13 at an input sampling frequency. Sampling rate converter 20 may convert the input sampling frequency to a desired output sampling frequency depending on an application for the digital signal.

Signal processor 14 may again process the digital signal at the desired output sampling frequency. In order to provide the signals to the user of WCD 10, sampler 15 comprises a digital-to-analog converter (DAC) and converts the digital signal at the desired output sampling frequency to an analog signal. Where a digital input signal represents audio data, the analog signal may be audible sound that is communicated to a user by speakers of device 10 or speakers coupled to device 10 (e.g., headphones).

WCD 10 may also receive signals from the user of WCD 10 (e.g., voice signals detected by a microphone of WCD, not shown). Controller 18 may receive analog signals, convert the analog signals to digital signals, and process and/or store the digital signals for transmission, playback, or other use. In this case, sampler 15 comprises an analog-to-digital converter (ADC) and converts the analog signal to a digital signal at an input sampling frequency. Signal processor 14 may process the digital signal at the input sampling frequency. Sampling rate converter 20 may convert the input sampling frequency to a desired output sampling frequency depending on an application for the digital signal. Signal processor 14 may again process the digital signal at the desired output sampling frequency. Codec 13 may encode the digital signal at a desired output sampling frequency. Transceiver 12 may then transmit the encoded wireless signal to the base stations via antenna 11, or the digital signal may be stored for later use.

In some examples, controller 18 may include dedicated sets of signal processors, sampling rate converters, and samplers for signals received by transceiver 12 and signals to be transmitted by transceiver 12. In any case, controller 18 may be implemented as one or more processors, digital signal processors (DSP), application specific integrated circuits (ASICs), field programmable gate arrays (FPGAs), complex programmable logic devices (CPLDs), discrete logic, software, hardware, firmware or any combinations thereof.

Prior to processing a digital signal, controller 18 determines a desired output sampling frequency, $f_o$, of a digital signal based on a potential application for the digital signal. Potential applications for the received digital signals may use a variety of sampling frequencies. For example, 8 kHz and 16 kHz sampling frequencies are typically used for voice communication applications. Audio compact disc (CD) applications typically use a 44.1 kHz sampling frequency. Digital audio tape (DAT) applications typically use a 48 kHz sampling frequency. Other examples of typical sampling frequencies may include 11.025 kHz, 12 kHz, 12.8 kHz, 22.05 kHz, 24 kHz, 32 kHz, and 44 kHz. Converting digital signals to different output sampling frequencies may be particularly useful for concurrently executing more than one digital signal application within WCD 10. For example, controller 18 may wish to convert a voice communication application with a sampling frequency of 8 kHz and an audio application with a sampling frequency of 48 kHz to a common sampling frequency to permit simultaneous execution of the voice communication and audio application. Thus, a user of WCD 10 may listen to music while answering a phone call. Controller 18 may adjust a sampling rate in real-time, so that WCD 10 may relatively seamlessly transition between audio playback at different output sampling rates.

Sampling rate converter 20 within controller 18 may include an up-sampler 22 and a down-sampler 23 to convert the sampling rate of the digital signal from the input sampling frequency to a desired output sampling frequency. Up-sampler 22 may convert an input signal at an input sampling frequency to an intermediate sampling frequency. The intermediate sampling frequency may be an arbitrary sampling frequency selected by controller 18. The intermediate sampling frequency may or may not be greater than the input sampling frequency. Sampling rate converter 20 may generate samples at the intermediate sampling frequency based on samples of the input signal at the input sampling frequency.

Down-sampler 23 may convert the intermediate samples at the intermediate sampling frequency to a desired output frequency. For example, down-sampler 23 may generate samples with timing that corresponds to a desired output sampling frequency specified by a conversion rate of sampling rate converter 20. In this manner, up-sampler 22 may increase a sampling frequency of the input digital signal to produce an intermediate digital signal with a bandwidth that is wider than a bandwidth of the original input digital signal. Up-sampler 22 may control distortion to the input digital signal spectrum and energy in the extended frequency band to a predetermined level to preserve fidelity of the signal. Up-sampler 22 may support arbitrary rational up-sampling rates to convert the input sampling frequency to the desired intermediate sampling frequency by performing up-sampling and interpolation.

As an example, up-sampler 22 may convert a sampling frequency of an input digital signal, $f_i$, by first up-sampling the input digital signal by a factor of N to Nfi. Then, the signal at sampling rate Nfi may be converted to an intermediate sampling frequency $f_o$ using interpolation. Such interpolation may be linear interpolation, cubic interpolation or any order of polynomial interpolation. The intermediate sampling frequency $f_o$ may be greater than or equal to a desired output frequency $f_{o\text{-}src}$. Down-sampler 23 may then convert the intermediate digital signal to a desired output sampling frequency $f_{o\text{-}src}$. In one example, down-sampler 23 is configured to down sample a signal from the intermediate digital signal based on an integer ratio. In one example, down-sampler 23 may operate to select, based on an integer value, a portion of intermediate samples generated by up-sampler 22 as output samples.

Up-sampler 22 may determine a relative timing of samples of an output signal (i.e., a rate-converted signal) based on non-approximated integer components 56 in accordance with the techniques described in this disclosure. In some examples, determining a relative timing of samples of the intermediate signal using integer components 56 allows the up-sampler to more accurately up-sample the input signal by reducing errors caused by approximation of infinite fractional numbers. Up-sampler 22 may represent relative timing of samples of the intermediate signal using three integer components 56 and track each component. The first component, referred to herein as an input sample index A, operates as a pointer to track a latest input sample that is used to generate a set of intermediate samples. The second component, referred to herein as the integer phase B, operates as a pointer to track one of a plurality of intermediate samples generated by the input sample pointed to by A. The third component, referred to herein as the fractional phase C, operates as a pointer to track a timing difference between a desired output sample and an intermediate sample corresponding to the integer phase B. In this manner, up-sampler 22 provides an integer representation of the relative timing between desired output samples and corresponding input samples. Components A, B, and C may also include associated stepsize values A', B', and C' that may be utilized to set incremental updates to the A, B, and C components. Stepsize values A', B', and C' 58 may define a conversion rate of up-sampler 22. Up-sampler 22 may also base a relative timing of output samples on step size adjustment components $\Delta A$, $\Delta B$, and $\Delta C$ 57 as shown in FIG. 1. Values for one or more of step size adjustment components 57 may be set or adjusted to adjust stepsize values A', B', and C'.

Setting or adjusting step size adjustment components 57 may adjust a conversion rate of up-sampler 22 in real-time.

Figure 2:
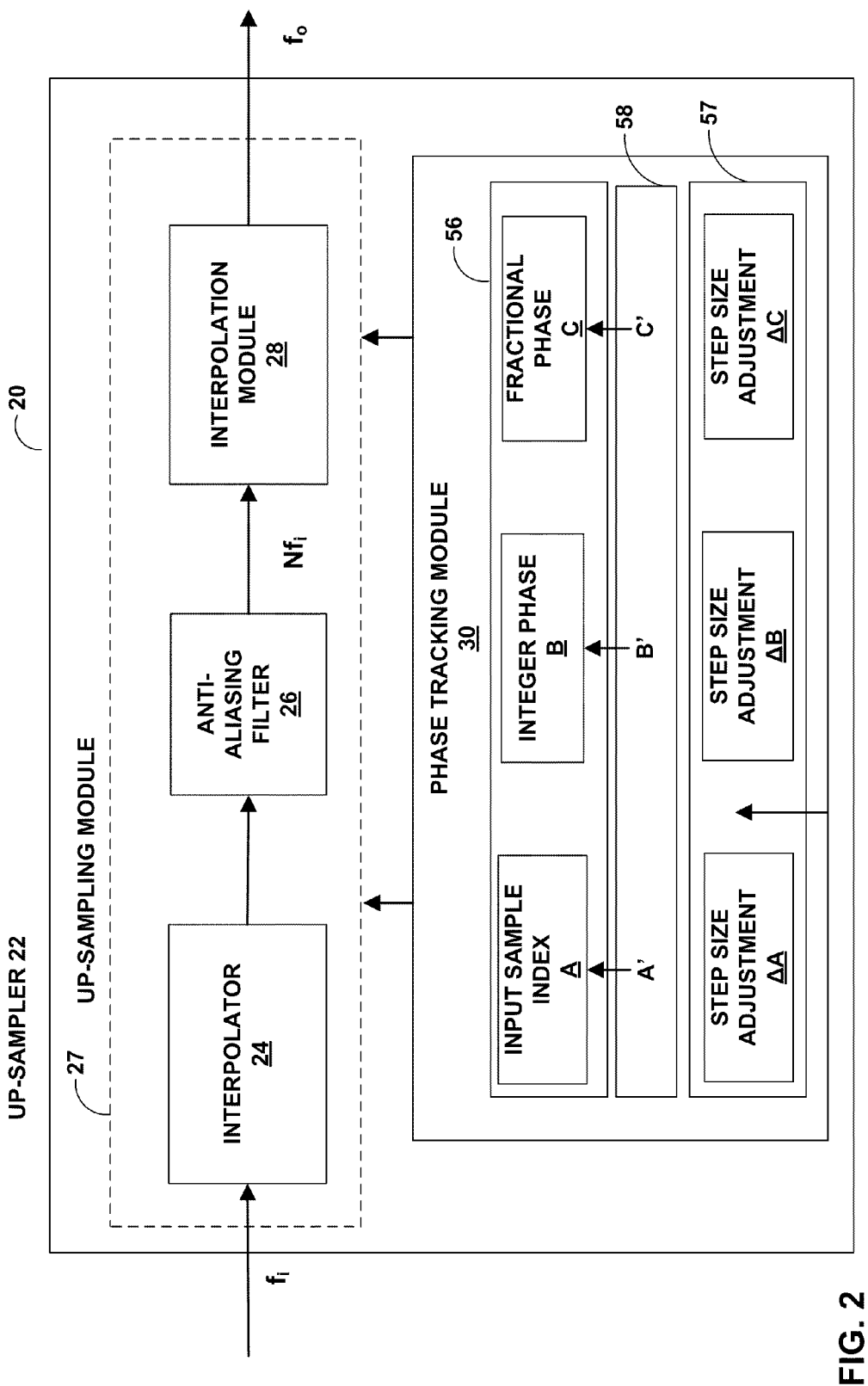
FIG. 2 is a block diagram illustrating one example of an SRC that adjusts a conversion rate of the SRC in real-time consistent with this disclosure.

FIG. 2 is a block diagram illustrating one example of an up-sampler 22 of a sample rate converter (SRC) 20 consistent with this disclosure. Up-sampler 22 depicted in FIG. 2 may generate output samples based on non-approximated integer representations 56 of relative timing of the samples in accordance with the techniques of this disclosure. In addition, up-sampler 22 may, in real-time, adjust a sampling rate based on selection of one or more step size adjustment components 57 associated with the integer values 56.

Up-sampler 22, as depicted in FIG. 2, includes an up-sampling module 27 and a phase tracking module 30. Up-sampling module 27 may up-sample an input digital signal from an input sampling frequency, to an intermediate sampling frequency, $f_o$. Up-sampling module 27 may include an interpolator 24 to achieve up-sampling by inserting N−1 zeros between adjacent input samples of the input digital signal. In this manner, interpolator 24 may up-sample the digital signal to the intermediate sampling frequency $f_o$. Up-sampling module 27 may filter the digital signal with an anti-aliasing filter 26 to remove any aliasing images or distortion present in the digital signal caused by inserting zeros. Anti-aliasing filter 26 may, for example, comprise a low pass filter with bandwidth $\pi/N$. Anti-aliasing filter 26 may be a polyphase filter as is known in the art.

Up-sampling module 27 may generate output samples at a desired sampling frequency, $f_o$, based on integer representations 56 of the phase. Up-sampling module 27 may include an interpolation module 28 that generates samples at a desired output sampling frequency using any of a number of interpolation methods, such as zero-order interpolation, linear interpolation, higher order interpolations, and varieties of spline interpolations. As one example, interpolation module 28 may generate samples using linear interpolation according to the equation:

$$s_o(n)=[1-\lambda(n)]s_m^{prev}(n)+\lambda(n)s_m^{next}(n),$$

In the above equation, $s_o(n)$ is an $n^{th}$ output sample, $s_m^{prev}(n)$ is a corresponding previous intermediate sample, $S_m^{next}(n)$ is a corresponding next intermediate sample, and $\lambda(n)$ is an interpolation coefficient, which is computed based on integer components 56 as described in detail below. A linear interpolation coefficient may be computed using the equation:

$$\lambda(n) = \frac{t(n) - t^{prev}(n)}{t^{next}(n) - t^{prev}(n)}$$

In the above equation, $t(n)$ is a relative sample time of an $n^{th}$ output sample, $t^{prev}(n)$ and $t^{next}(n)$ are the relative sample times of a previous intermediate sample and a next intermediate sample, respectively. To minimize interpolation error, $\lambda(n)$ should be computed as accurately as possible. In accordance the above equation, interpolation module 28 outputs a previous intermediate sample when the timing of the output sample corresponds to the timing of the previous intermediate sample, i.e., when $\lambda(n)$ is equal to zero. In other words, up-sampling module 27 does not have to perform linear interpolation, because the output sample timing is identical to that of the previous intermediate sample. If $\lambda(n)$ is not equal to zero, interpolation module 28 performs interpolation to generate an output sample based on the previous intermediate sample and the next intermediate sample. Although this disclosure focuses on down-sampling from the intermediate sample frequency to the desired output sampling frequency using linear interpolation, the techniques described herein may be applied to any order of interpolation, such as zero-order interpolation, linear interpolation, higher order interpolations, and varieties of spline interpolations.

In accordance with the techniques of this disclosure, up-sampler 22 may determine timing, or phase, of output samples using components 56. More specifically, phase tracking module 30 may represent output sample phase using three components. Phase tracking module 30 may, for example represent a timing of an output sample $\tau(n)$ as:

$$\tau(n)=A(n)+1/N*[B(n)+C(n)/f_m]$$

As discussed in further detail below, phase tracking module 30 may further be operative to utilize one or more step size adjustment components 57 to provide adjustment of a sampling rate conversion ratio in real-time.

Figure 3:
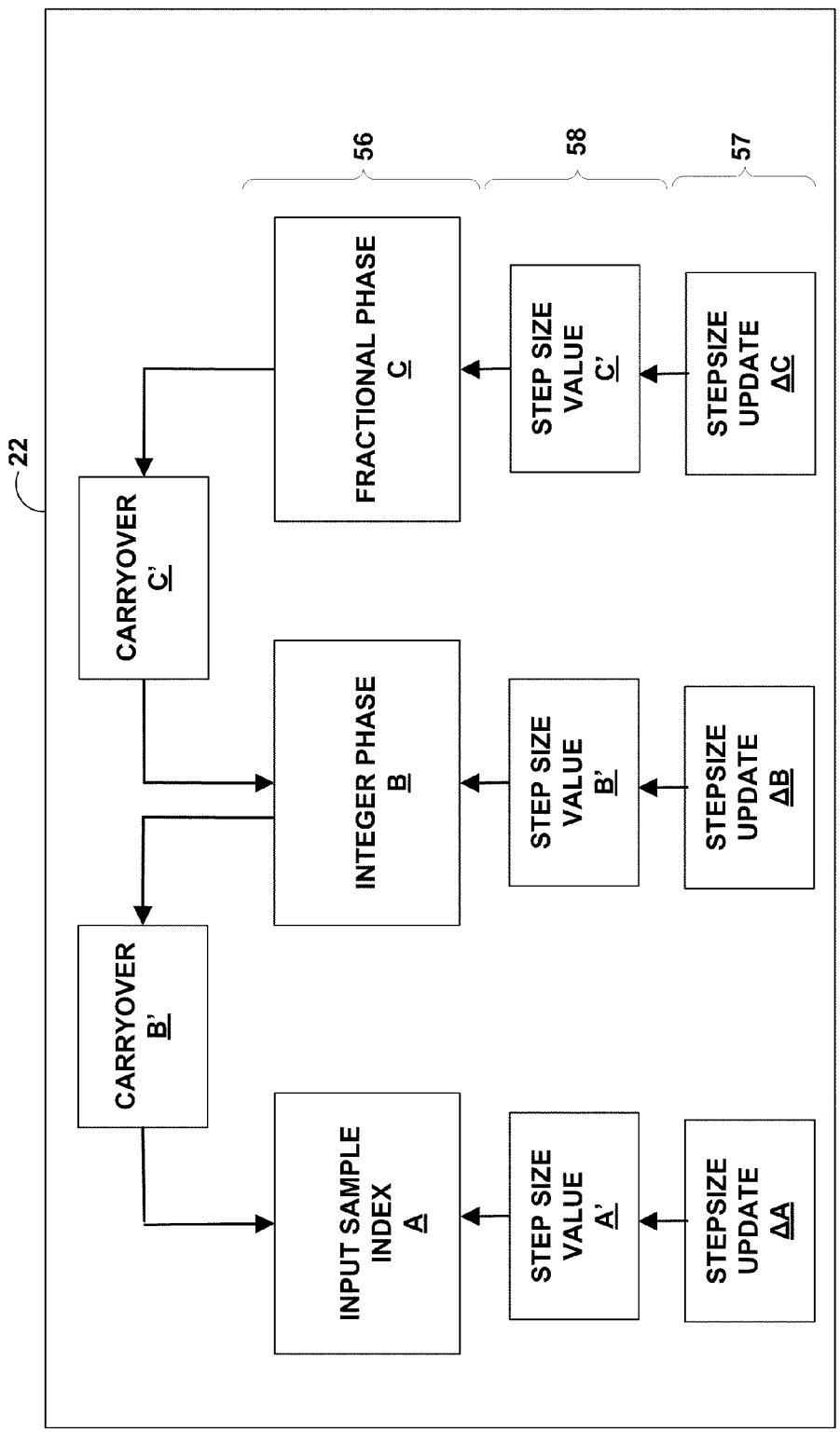
FIG. 3 is a conceptual diagram illustrating an SRC that adjusts a conversion rate of the SRC in real-time consistent with techniques of this disclosure.

FIG. 3 is a conceptual diagram depicting integer components 56 and step size adjustment components 57 as used by phase tracking module 30 according to techniques of this disclosure. To determine a relative timing of for each generated output sample, phase tracking module 30 may update values for integer components 56 recursively, i.e., values for integer components 56 may be incremented as samples are processed. Integer components 56 may be updated based on their values at time n−1. In other words, integer components 56 of a previous output sample may be used to determine the integer components 56 of a next desired output sample.

During initialization, up-sampler 22 may determine an integer phase step size value B' and a fractional phase step size value C'. The B' and C' step size values may define a recursive update for components A, B and C 56. In one example, phase tracking module 30 may compute the B and C step size values B' and C' in accordance with the following equations:

$$B'(0)=[Nf_i/f_o]$$

$$C'(0)=\mathrm{mod}(Nf_i,f_o)=Nf_i-B'(0)f_o$$

where N is an up-sampling factor, and $f_o$ and $f_i$ are input frequency and output frequency, respectively. In the equations above, the function [x] denotes a floor function that equals the largest integer that is less than or equal to variable x, and mod(A, B) denotes the positive remainder of the division of A by B. In other words, the integer phase step size value B' is the quotient of $Nf_i$ divided by $f_o$, and the fraction phase step size value C' is the corresponding remainder.

During operation, phase tracking module 30 may update the fractional phase C of a previous output sample to obtain a fractional phase C of a current output sample C(n) according to the equation:

$$C(n) = \begin{cases} C(n-1) + C'(n) & 0 \le C(n-1) + C'(n) < f_o \\ C(n-1) + C'(n) - f_o & C(n-1) + C'(n) \ge f_o \\ C(n-1) + C'(n) + f_o & 0 > C(n-1) + C'(n) \end{cases}$$

Additionally, as shown in FIG. 3, phase tracking module 30 may incorporate a carryover $\gamma_c(n)$ for component C. Carryover $\gamma_c(n)$ may indicate that component C has met or exceeded a threshold value. When carryover $\gamma_c(n)$ is asserted (e.g., equal to a value of 1 or −1), phase tracking module 30 may update a integer phase B, e.g., integer phase B may skip one or more of a plurality of intermediate samples at a sampling rate $Nf_i$ based on the carryover $\gamma_c(n)$. In one example, carryover $\gamma_c(n)$ is set to a value of 1 when fractional phase component C has a value that is greater than or equal to $f_o$ or a value of −1 when fractional phase component C has a value that is less than 0.

During operation, phase tracking module 30 may also be operable to recursively compute an integer phase B value of a current output sample using an integer phase B of a previous output sample. A value by which integer phase B is recursively updated may be determined based on the integer phase step size value B', and carryover $\gamma_c(n)$. As described above, integer phase component B may identify one of a plurality of intermediate samples from which the timing of an output sample is referenced. As an example, integer phase component B may identify an intermediate sample immediately previous to a desired output sample. Phase tracking module 30 may, for example, compute the integer phase of the current output sample according to the equation:

$$B(n) = \begin{cases} B(n-1) + B'(n) + \gamma_c(n) & 0 \le B(n-1) + B'(n) + \gamma_c(n) < N \\ B(n-1) + B'(n) + \gamma_c(n) - N & B(n-1) + B'(n) + \gamma_c(n) \ge N \\ B(n-1) + B'(n) + \gamma_c(n) + N & 0 > B(n-1) + B'(n) + \gamma_c(n) \end{cases}$$

Additionally, as shown in FIG. 3, phase tracking module 30 may incorporate a carryover $\gamma_b(n)$ for integer phase component B. Carryover $\gamma_b(n)$ may indicate that a value for integer phase B has exceeded or equaled a threshold value. When carryover $\gamma_b(n)$ is asserted (e.g., equal to a value of 1 or −1), phase tracking module 30 may update a value of input sample index A, e.g., input sample index A may increment to a new input sample based on the carryover $\gamma_b(n)$. In one example, carryover $\gamma_b(n)$ is set to a value of 1 when $B(n-1)+B'(n)+\gamma_a(n)$ is greater than or equal to the up-sampling rate N or a value of −1 when $B(n-1)+B'(n)+\gamma_c(n)$ is less than 0. In the equations above, the subscript m represents an index of one of the intermediate samples.

As also shown in FIG. 3, phase tracking module 30 may implement a step size adjustment component ΔC associated with fractional phase component C, a step size adjustment component ΔB associated with integer phase component B, and a step size adjustment component ΔA associated with input sample index A. As discussed above, phase tracking module 30 may recursively update values for each of components A, B, and C as input samples are processed and output samples are generated. In typical operation, up-sampler 22 may update these values based on one or more step size values B', C' for components B and C. By, in addition, configuring phase tracking module 30 to incorporate step size adjustment components 57 for each of components A, B, and C 58, a conversion rate may be adjusted in real-time during operation of sampling rate converter 20 to convert a sampling rate of a digital input signal. For example, setting or adjusting one or more of step size adjustment components 57 may cause a modification of step size values A', B', and/or C' 58 which may result in an incremental update to one or more of components 56. To state it another way, step size adjustment components ΔA, ΔB and ΔC 57 may modify an incremental update defined by step size values A', B', and/or C' 58 for one or more of components 56.

In operation, assertion of step size adjustment components ΔA, ΔB and ΔC 57 may cause step size values A', B', and C' 58 to be recursively updated during operation of sampling rate converter 20 to generate output samples. Phase tracking module 30 may incorporate carryovers $\gamma'_b(n)$, $\gamma'_c(n)$ for step size values B' and C'. For example, carryover $\gamma'_c(n)$ may be implemented such that, when carryover $\gamma'_c(n)$ has a value of 1 or −1 due to assertion of step size adjustment components ΔA, ΔB and ΔC 57, the value may be applied to step size value B' to update a step size value for component B in addition to an adjustment to B' indicated by step size adjustment component ΔB. Similarly, carryover $\gamma'_b(n)$ may be implemented such that, when carryover $\gamma'_b(n)$ has a value of 1 or −1 due to assertion of step size adjustment components ΔA, ΔB and ΔC 57, the value may be applied to step size value A' to update a step size value for component A in addition to an adjustment to A' indicated by step size adjustment component ΔA.

As discussed above, integer phase B may operate as a pointer to an intermediate sample generated based on an input sample indicated by input sample index A. Integer phase B may "point" to a timing of an intermediate sample based on a number of samples defined by a bandwidth π/N of an anti-aliasing filter of up-sampler 22. For example, integer phase B may point to a 4$^{th}$ sample out of N=24 samples from which to generate an output sample. Integer phase step size adjustment component ΔB may be utilized to deviate from integer phase 4 "pointing" to a particular input sample based only on bandwidth 1/N. For example, integer phase step size adjustment component ΔB may be an amount of modification of an incremental update to integer phase B defined by step size value B' during operation. Thus, instead of integer phase B incrementing by a value represented by π/N (or 2π/N, or 3π/N, or xπ/N), phase tracking module 30 may increment a value for integer phase B based on step size value B' and an adjustment to step size value B' defined by ΔB, where ΔB is the integer phase step size adjustment component. Similarly phase tracking module 30 may incrementally update fractional phase component C and/or input sample index A component recursively according to respective fractional phase step size adjustment component ΔC and input sample index step size adjustment component ΔA as discussed above.

In one example, recursive updates to components A, B, and C 56 may be based upon step size values A', B', and C' and selected values for step size adjustment components ΔA, ΔB and ΔC 58 according to the following equations:

$$C(n) = \begin{cases} C(n-1) + C'(n) & 0 \le C(n-1) + C'(n) < f_o \\ C(n-1) + C'(n) - f_o & C(n-1) + C'(n) \ge f_o \\ C(n-1) + C'(n) + f_o & 0 > C(n-1) + C'(n) \end{cases}$$

$$B(n) = \begin{cases} B(n-1) + B'(n) + \gamma_c(n) & 0 < B(n-1) + B'(n) + \gamma_c(n) < N \\ B(n-1) + B'(n) + \gamma_c(n) - N & B(n-1) + B'(n) + \gamma_c(n) \ge N \\ B(n-1) + B'(n) + \gamma_c(n) + N & 0 > B(n-1) + B'(n) + \gamma_c(n) \end{cases}$$

$$A(n) = A(n-1) + A'(n-1) + \gamma_b(n)$$

where:

$$\gamma_c(n) = \begin{cases} 0 & 0 \le C(n-1) + C'(n) < f_o \\ 1 & C(n-1) + C'(n) \ge f_o \\ -1 & C(n-1) + C'(n) < 0 \end{cases}$$

$$\gamma_b(n) = \begin{cases} 0 & 0 \le B(n-1) + B'(n) + \gamma_c(n) < N \\ 1 & B(n-1) + B'(n) + \gamma_c(n) \ge N \\ -1 & B(n-1) + B'(n) + \gamma_c(n) < 0 \end{cases}$$

-continued and:

$$C'(n) = \begin{cases} C'(n-1) + \Delta C(n) & 0 \leq C'(n-1) + \Delta C(n) < f_o \\ C'(n-1) + \Delta C(n) - f_o & C'(n-1) + \Delta C(n) \geq f_o \\ C'(n-1) + \Delta C(n) + f_o & 0 > C'(n-1) + \Delta C(n) \end{cases}$$

$$B'(n) = \begin{cases} B'(n-1) + \Delta B(n) + \gamma'_c(n) & 0 \leq B'(n-1) + \Delta B(n) + \gamma'_c(n) < N \\ B'(n-1) + \Delta B(n) + \gamma'_c(n) - N & B'(n-1) + \Delta B(n) + \gamma'_c(n) \geq N \\ B'(n-1) + \Delta B(n) + \gamma'_c(n) + N & 0 > B'(n-1) + \Delta B(n) + \gamma'_c(n) \end{cases}$$

$$A'(n) = A'(n-1) + \Delta A(n-1) + \gamma'_b(n)$$

and:

$$\gamma'_c(n) = \begin{cases} 0 & 0 \leq C'^{(n-1)} + \Delta C(n) < f_o \\ 1 & C'^{(n-1)} + \Delta C(n) \geq f_o \\ -1 & C'^{(n-1)} + \Delta C(n) < 0 \end{cases}$$

and:

$$\gamma'_b(n) = \begin{cases} 0 & 0 \leq B'(n-1) + \Delta B(n) + \gamma'_c(n) < N \\ 1 & B'(n-1) + \Delta B(n) + \gamma'_c(n) \geq N \\ -1 & B'(n-1) + \Delta B(n) + \gamma'_c(n) < 0 \end{cases}$$

According to the equations described above, each of components A, B, and C 56 may be caused to incrementally update differently than if step size components ΔA, ΔB and ΔC 57 were not used. Thus, it may be possible utilizing step size components ΔA, ΔB and ΔC 57 to speed up or slow down generation of output samples with respect to input samples of an input digital signal in real-time. For example, step size component ΔA, ΔB and ΔC 57 may be selected to be less than nominal value (slow down sampling rate conversion rate, i.e., generate less samples than the nominal value) or greater than nominal value (speed up sampling rate conversion rate, i.e., generate more samples than the nominal value). In some examples a nominal value is equal to zero. According to these examples, a positive value for one or more step size adjustment components may reduce up a conversion rate, while a negative value for the one or more step size components may increase a conversion rate.

Step size adjustment components ΔA, ΔB, and ΔC 57 may enable adjustment of a conversion rate in real-time while eliminating and/or reducing error caused by the quantization of infinite fractional numbers. Step size adjustment components ΔA, ΔB, and/or ΔC 57 may be asserted so as to minimize audible artifacts in playback of an output signal. For example, one or more of step size adjustment components ΔA, ΔB, and/or ΔC 57 may be asserted for a single iteration of up-sampler 22, or for a number of sequential iterations to generate output samples. In other examples, one or more of step size adjustment components ΔA, ΔB, and/or ΔC 57 may be asserted intermittently, for example one or more of step size adjustment components ΔA, ΔB, and/or ΔC 57 may be asserted for every tenth sequential iteration of up-sampler 22, or according to any number of sequential iterations.

Figure 4:
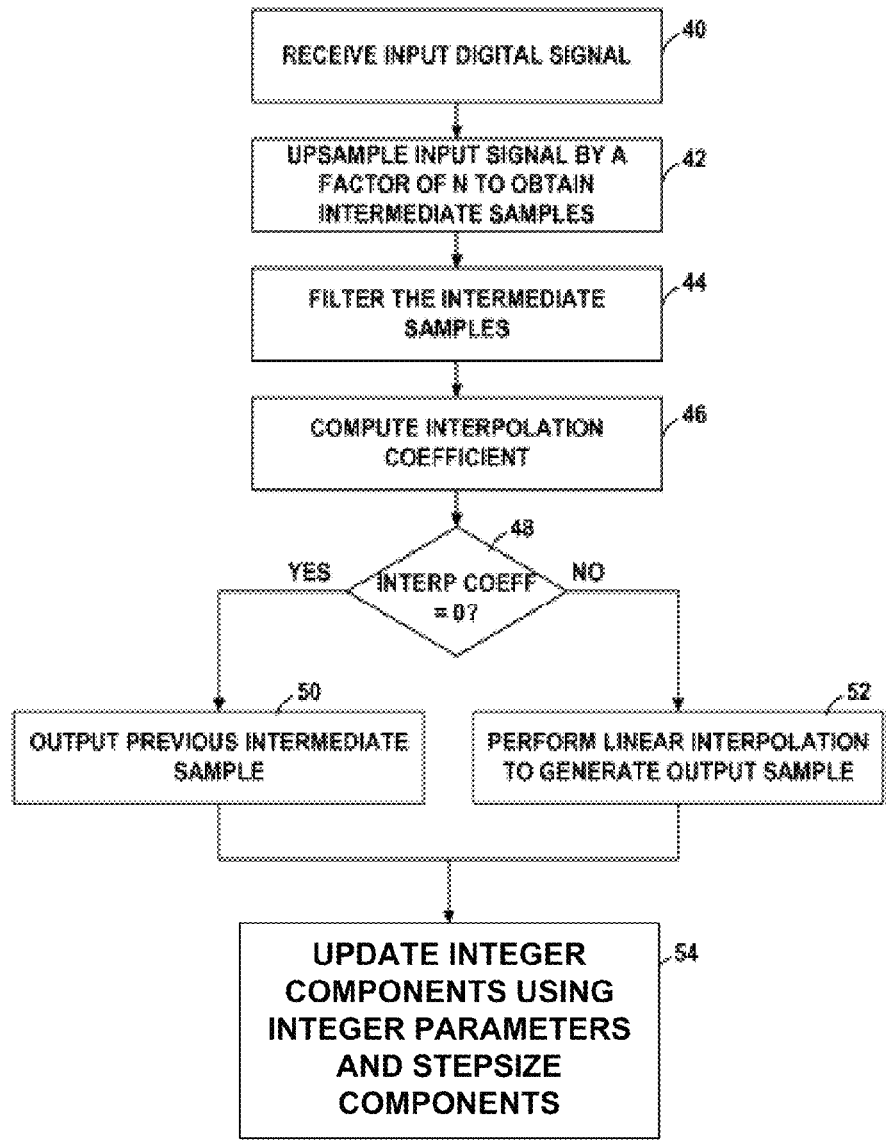
FIG. 4 is a flow chart illustrating one example of operation of an SRC to generate output samples based on integer components and step size components associated with the integer components consistent with techniques of this disclosure.

FIG. 4 is a flow chart diagram illustrating one example of a method of operating a sample rate converter to generate output samples consistent with techniques of this disclosure. SRC 20 may receive an input digital signal at an input sampling frequency fi (40). Up-sampler 22 may up-sample the input digital signal from the input sampling frequency, $f_i$, to an intermediate sampling frequency, $f_o$ (42). Up-sampler 22 may up-sample the input digital signal by a factor of N by inserting N−1 zeros between adjacent input samples of the digital signal and by filtering the resulted signal with an anti-aliasing filter to remove any aliasing images or distortion present in the digital signal. Anti-aliasing filter 26 may be a low pass filter with bandwidth π/N. Interpolation module 28 may compute a linear interpolation coefficient using a fractional phase component 6 (46). Interpolation module 28 may compute the linear interpolation coefficient using the equation:

$$\lambda(n) = C(n)/f_o$$

Interpolation module 28 may determine whether the interpolation coefficient is equal to zero (50). If the interpolation coefficient is equal to zero, the timing of the previous intermediate sample corresponds to the timing of a desired output sample and interpolation module 28 does not need to perform linear interpolation. Instead, interpolation module 28 outputs the previous intermediate sample that corresponds to integer phase component B associated with the previous intermediate sample. Interpolation module 28 may select a previous intermediate sample using input sample index A and the integer phase B associated with the previous intermediate sample, and output the generated intermediate sample as the output sample.

If the interpolation coefficient does not equal zero, interpolation module 28 may perform interpolation to generate the output sample (52). Interpolation module 28 may use linear interpolation to generate the output signal $s_o(n)$ according to the equation:

$$s_o(n) = [1-\lambda(n)]s_m^{prev}(n) + \lambda(n) s_m^{next}(n)$$

where $\lambda(n)$ is the computed interpolation coefficient, $s_m^{prev}(n)$ is a previous intermediate sample, and $s_m^{next}(n)$ is a next intermediate sample.

Up-sampler 22 may track a phase of an output sample using integer values 56, step size values 58, and/or step size adjustment components 57 associated with the integer values (54). Specifically, up-sampler 22 represents the phase of an output sample using three components, i.e., the input sample index A(n), the integer phase 4 B(n) and the fractional phase C(n), and tracks each component using integer numbers as described in detail in this disclosure. As an example, the input sample index A and integer phase B associated with a previous intermediate sample and the fractional phase C, along with, step size values 58 and/or one or more step size adjustment components 57, may be used to represent a phase of output samples.

Figure 5A:
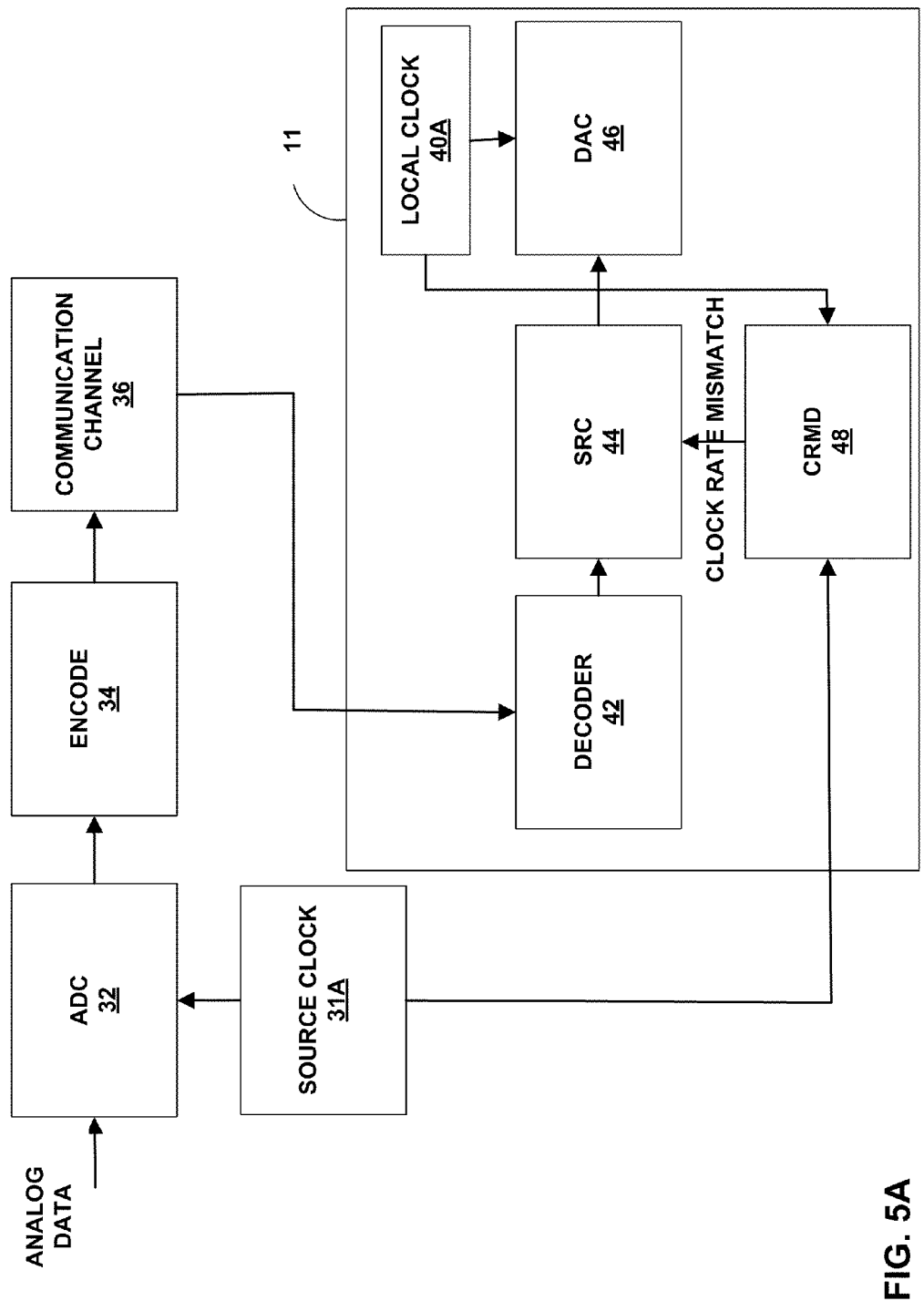
FIGS. 5A and 5B are flow chart diagrams illustrating examples of systems that streaming digital media consistent with the techniques of this disclosure.
Figure 5B:
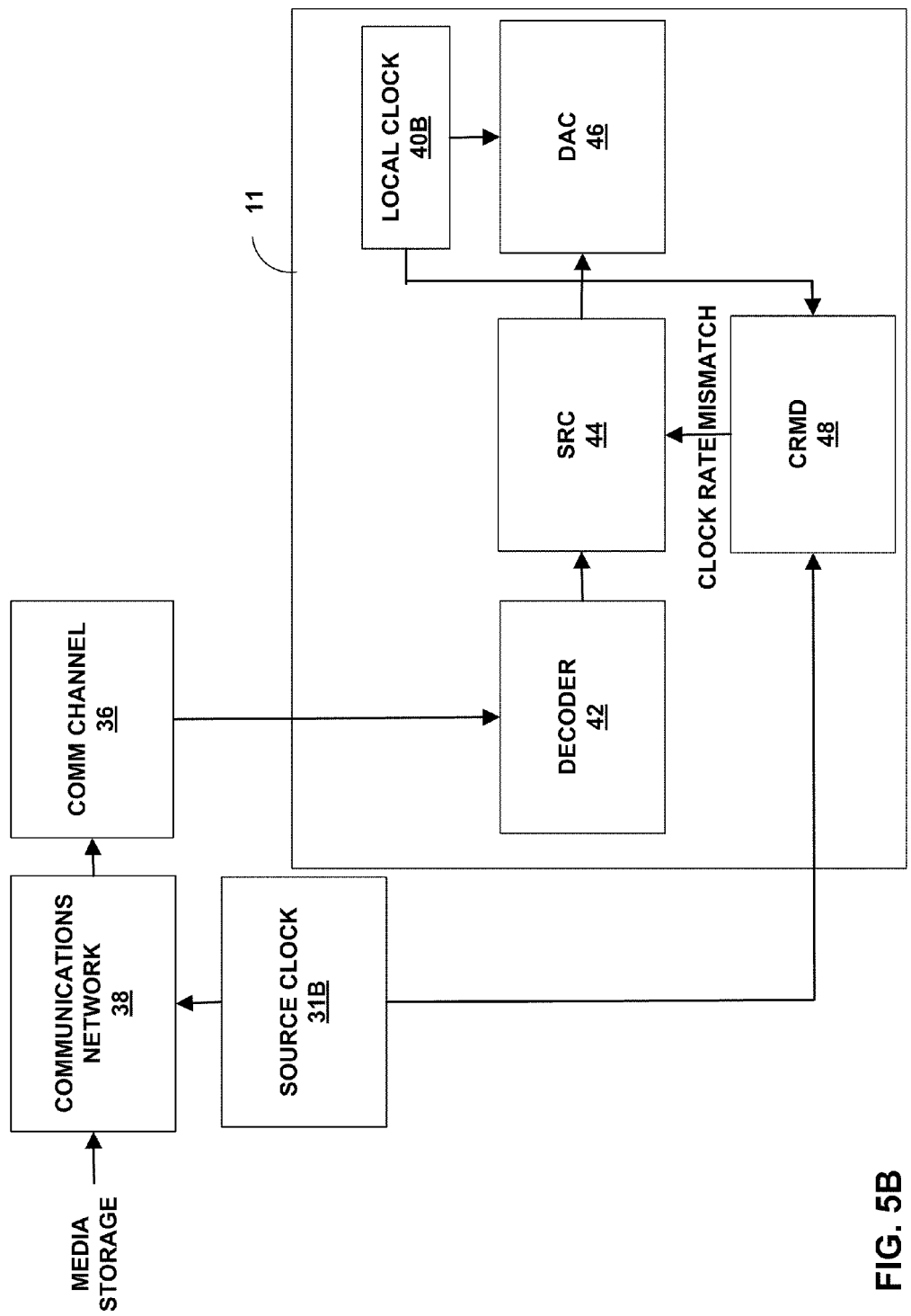

FIGS. 5A and 5B are block diagrams illustrating generally examples of systems used to stream digital signals for playback. The digital signal may be representative of audio data for the reproduction of audible sounds, or video data for the reproduction of visual images. The digital signal may also be a combination of both audio data and visual data (e.g., video data to be displayed on a display device). The foregoing examples are set forth with respect to audio data, however digital representations of visual data may also be streamed according to the techniques of this disclosure.

In one example as shown in FIG. 5A, an analog to digital converter (ADC) 32 may be utilized to convert analog data to a digital representation. In one example, the analog data may be audible sounds that are recorded by digitally sampling the audible sounds. In other examples, the analog data may represent an analog recording of audible sounds, e.g., on a record, cassette tape, or other analog recording medium. The ADC 32 may convert the analog recording to a digital representation of the audible sounds that may be utilized for playback by a digital reproduction device (e.g., a CD player, mp3 player, personal computer, or like device configured to playback digital representations of audio data). The digital representation may consist of a series of samples of the analog data. As shown in FIG. 5A, ADC 32 may operate to convert analog data to digital data based on a source clock 31.

A digital representation of data created by ADC 32 may then be encoded for transmission by encoder 34. Encoder 34 may manipulate the digital representation created by ADC 32 into a format for transmission. An encoded digital signal may then be transmitted to a receiving device 11 via a communications channel 36. Communications channel 36 may any mechanism for wireless or wired communication. For example, communications channel 36 may be a network such as the Internet. Communications channel 36 may instead be a cellular network, a telephony network, or any other form of communications that enables the transmission of digital data to receiving device 11. Encoder 34 may be configured to manipulate the digital representation created by ADC 32 into a format dictated by a particular communications channel 36. Accordingly, encoder 34 may be any device capable of modifying a digital signal for one or more types of communication channels 36. As discussed above, receiving device 11 may be a mobile device such as a cellular phone, smartbook, laptop computer, personal digital assistant (PDA), or any other device capable of receiving digital data transmissions.

FIG. 5B illustrates another examples of a system used to stream digital signals for playback. As shown in FIG. 5B, data intended for playback may be digital data stored in some form of media storage. For example, digital data may be stored in one or more of a volatile memory such as random access memory (RAM), dynamic random access memory (DRAM), static random access memory (SRAM), synchronous dynamic random access memory (SDRAM), or non-volatile storage such as a computer hard disc, a flash drive, optical storage media (e.g., compact disc (CD), digital video disc (DVD)), electrically erasable programmable read only memory (EEPROM) or other mechanism for the storage of digital data. The digital data may be accessible via communications network 38. Communications network 38 may be one or more devices configured to communicate digital data over a network. Communications network 38 may operate based on source clock 31A. Communications network 38 may transmit, via communications channel 36 (e.g., the Internet), the digital data.

Device 11 as illustrated in FIGS. 5A and 5B includes a decoder 42. Decoder 42 may receive a digital signal via communications channel 36 and decode the digital signal for processing. Like encoder 34, decoder 42 may be configured to decode a received digital signal according to a communications channel 36 used to transmit the digital signal. Device 11 may also include a local clock 40A, 40B. Local clock 40A, 40B may be a clock local to device 11 that operates independently from source clock 31A, 31B. Local clock 40 may be used to operate components of device 11, for example decoder 42, sample rate converter (SRC) 44, and digital to analog converter 46.

In some examples, source clock 31A, 31B and local clock 40A, 40B may not be synchronized to one another. Furthermore, this lack of synchronization between source clock 31A, 31B and local clock 40A, 40B may result in a reduction in the quality of playback of a digital signal. For example, if the source clock is slower than a local device clock, device 11 may run out of samples of the input digital signal for playback, which may result in a playback gap when reproducing the input signal for playback. In another example, if source clock 31A, 31B is faster than local clock 40A, 40B, then un-played samples may be lost, which may result in degradation of audio quality.

Devices may compensate for a mismatch between a source clock and a local clock by one of two methods. According to a first method of mismatch compensation, samples may be added or removed from an input digital signal to compensate for clock rate mismatch. This method may be undesirable in some applications, because it may result in an audible reduction in playback quality. According to a second method an input digital signal may be "time warped," or shifted in time, to align a clock of the input digital signal (source clock 31A, 31B) to a local clock of device 11. This method may be undesirable, because in order to accurately time warp an input digital signal, a highly accurate clock is typically required. One example of a highly accurate clock is a phase lock loop (PLL), which may be expensive to implement, may take up a relatively large amount of physical space within device 11, and/or may consume a relatively large amount of power.

The techniques of this disclosure may be used to compensate for clock rate mismatch between a local device clock 40A, 40B and a source clock 31A, 31B, by adjusting a conversion ratio of sample rate converter (SRC) 44. The conversion rate may be adjusted based on a detected mismatch between a local clock 40 and a source clock 31A, 31B. As such, device 11 may include clock rate mismatch detector (CRMD) 48. CRMD 48 may be circuitry, software, or any combination of circuitry and software that detects a mismatch between two clocks and provide an indication of the detected mismatch. CRMD 48 may generate one or more indications of clock rate mismatch, and provide the one or more indications to SRC 44. By adjusting the conversion rate in light of detected clock rate mismatch, output samples of SRC 44 may be aligned with a local device clock 40. DAC 46 and/or other signal processing circuitry of device 11 may be operated based on the local device clock 40. Therefore, output samples generated by SRC 44 may match up with operation of DAC 46, and as such a quality of digital playback may be improved in light of a mismatch between a local clock 40A, 40B and a source clock 31A, 31B. Such techniques may be advantageous, because device 11 may compensate for clock rate mismatch without a reduction in playback quality as discussed with respect to the first known method for clock rate mismatch compensation described above, and without a need for a highly accurate clock as discussed with respect to the second known method for clock rate mismatch compensation described above.

Figure 6:
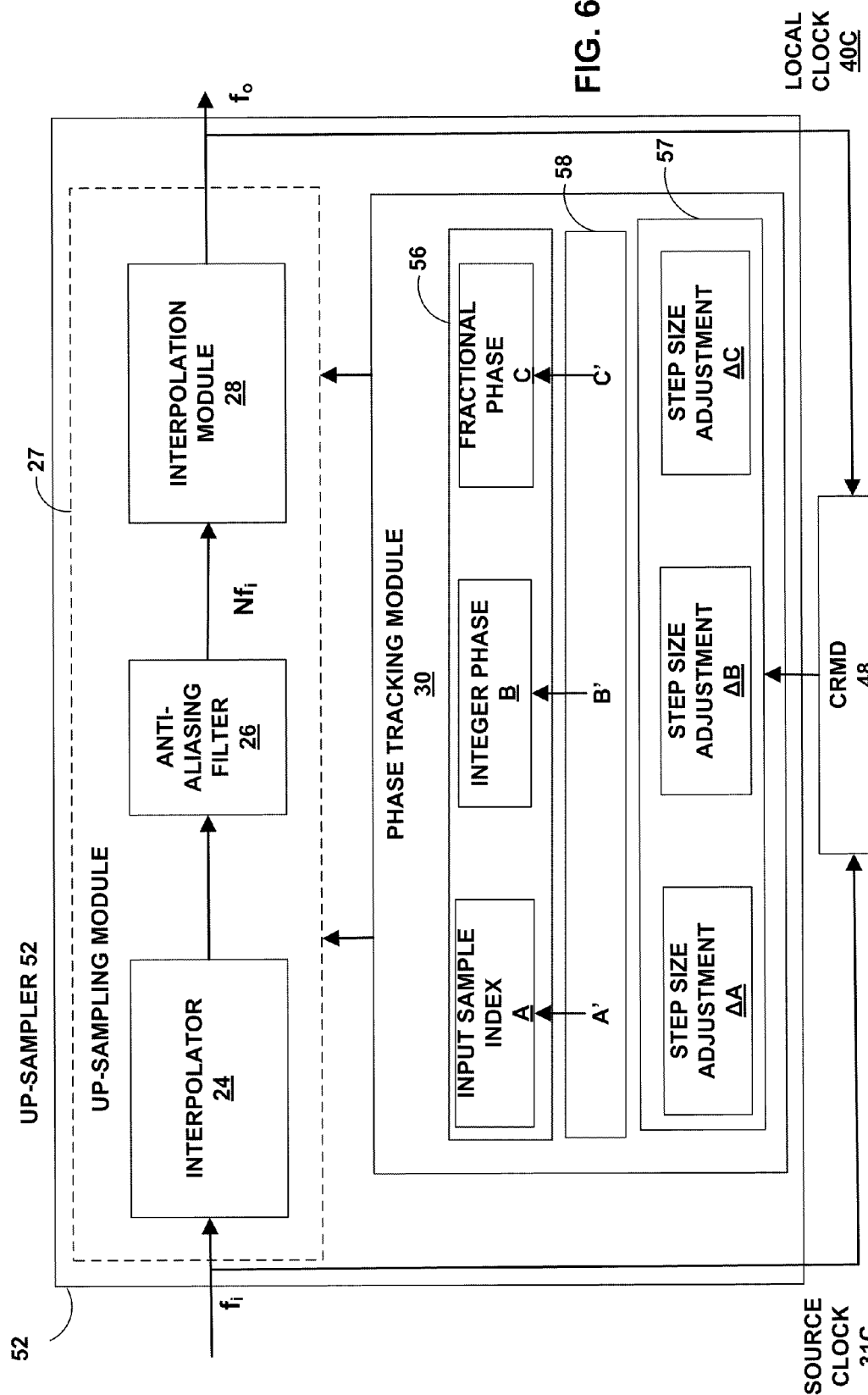
FIG. 6 is a block diagram illustrating one example of an SRC that adjusts a conversion rate of the SRC in real-time.

FIG. 6 is a block diagram illustrating one example of an up-sampler 52 consistent with techniques of this disclosure. The example of FIG. 6 is identical to the example of FIG. 2, however up-sampler 52 further includes clock rate mismatch detector 48. In various examples, clock rate mismatch detector 48 may provide a comparison of a local clock 31 of a device 11 upon which up-sampler 52 is operating. Phase tracking module 30 may receive one or more indications of clock rate mismatch from clock rate mismatch detector 48, and adjust a sampling rate of up-sampler 52 in response to a detected clock mismatch.

In one example, phase tracking module 30 may be operative to adjust a conversion ratio of up-sampler 52 in real-time, i.e., when up-sampler 52 is operating to generate samples. In one example in which phase tracking module 30 operates to generate samples based on integer components A, B, and C 56 as described above, phase tracking module 30 may adjust a sampling rate in response to detected clock rate mismatch by setting one or more of step size adjustment components ΔA, ΔB, and/or ΔC 57. As discussed above, step size adjustment components ΔA, ΔB, and/or ΔC 57 may cause a change in a relative timing of output samples of up-sampler 52. Step size adjustment components ΔA, ΔB, and/or ΔC 57 may be asserted so as to minimize audible artifacts in playback of an output signal. For example, one or more of step size adjustment components ΔA, ΔB, and/or ΔC 57 may be asserted for a single iteration of up-sampler 52, or for a small number of sequential iterations to generate samples. In other examples, one or more of step size adjustment components ΔA, ΔB, and/or ΔC 57 may be asserted intermittently, for example one or more of step size components ΔA, ΔB, and/or ΔC 57 may be asserted for every tenth sequential iteration of up-sampler 52, or according to any number of sequential iterations.

In some examples CRMD 48 may determine a mismatch between a local clock 31C and a source clock 40C based on one or more received indications of received by device 11. For example, according some forms of digital video broadcast, an indication of a source clock 40C is transmitted in addition to a video signal. As such, CRMD 48 may compare timing the received indication of source clock 40C, and compare the indication to a local clock 31C (e.g., comparison of clock pulse rising or falling edges).

In other examples, device 11 may include one or more buffers. The one or more buffers may be input buffers or output buffers. In one example, based on knowledge of expected input or output signal sampling rates, the one or more buffers may be monitored by CRMD 48 to determine a rate at which the buffer depth (contents) is increasing or decreasing relative to a local clock. For example, CRMD 48 may be configured to compare a depth of the buffer relative to one or more pre-determined thresholds, and adjust a conversion rate of up-sampler 52 in response to the buffer depth exceeding (or falling below) the one or more pre-determined thresholds. Thus, CRMD 48 may monitor the one or more buffers in order to estimate a mismatch between a local clock 40C and a source clock 31C.

Figure 7:
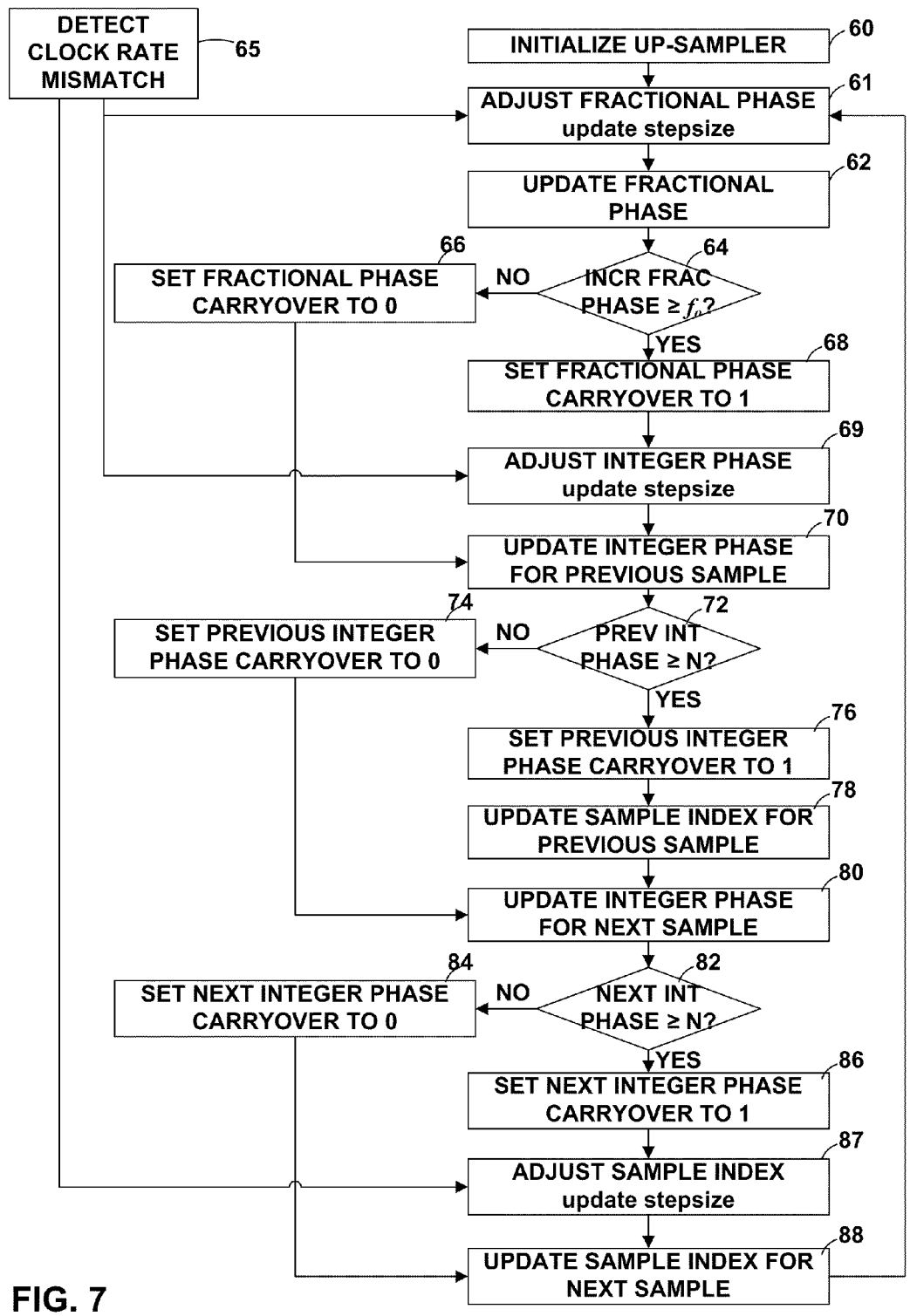
FIG. 7 is a flow chart diagram that depicts a method of adjusting an SRC conversion rate based on one or more step size components associated with integer components consistent with techniques of this disclosure.

FIG. 7 is a flow chart diagram that illustrates one example of a method of converting a sample rate of an input digital signal consistent with techniques of this disclosure. As described above, determining the relative timing using non-approximated integer components 56 allows up-sampler 52 to more accurately up-sample the input signal by reducing the errors caused by approximation of infinite fractional numbers or clock difference. As also described above, a conversion rate of up-sampler 52 may be adjusted in real-time, by setting or adjusting one or more step size adjustment components 57.

Up-sampler 52 is initialized (60). During initialization, up-sampler 52 computes an integer phase step size value B' and a fractional phase step size value C'. The integer phase step size value B' and fractional phase step size value C' may dictate a sequential phase update for components B and C. In one example, up-sampler 52 may compute the integer phase step size value B' and fractional phase step size value C' in accordance with the following equations:

$$B' = \lfloor Nf_i/f_o \rfloor$$

$$C' = \mod(Nf_i, f_o) = Nf_i - B'f_o$$

where N is an interpolation rate, and $f_o$ and $f_i$ are input frequency and output frequency of the up-sampler 52, respectively.

Up-sampler 52 may also adjust or set a fractional phase step size adjustment component ΔC (61). The fractional phase step size adjustment component ΔC may represent an amount of phase by which fractional phase component C is adjusted (via modification of fractional phase step size value C') in operation. For example, a value of fraction phase step size adjustment component ΔC may be added to or subtracted from a phase update indicated by fractional phase step size value C'. Up-sampler 52 may determine a value for fractional phase step size adjustment component ΔC based on a detected clock rate mismatch from CRMD 65. A value for fractional phase step size adjustment component ΔC may be determine such that a desired change in conversion rate is caused over an arbitrary number of iterative cycles of up-sampler 52. In one example, a value for fractional phase step size adjustment component ΔC may be determined to cause a change in a single iterative cycle of up-sampler 52. In other examples, a value for fractional phase step size adjustment component ΔC may be selected to cause a change over a series of iterative cycles of up-sampler 52. A value of fractional phase step size adjustment component ΔC may be selected so as to minimize any detectable defects in playback caused by a changing sampling rate.

Up-sampler 52 may further update the fractional phase component C (62). The update to the fractional phase component may include the incremental update specified by the fraction phase step size value C', adjusted by a value specified by the fractional phase step size adjustment component ΔC. In one example, the fraction phase component C may be updated according to the equation:

$$C(n) = \begin{cases} C(n-1) + C'(n) & 0 \le C(n-1) + C'(n) < f_o \\ C(n-1) + C'(n) - f_o & C(n-1) + C'(n) \ge f_o \\ C(n-1) + C'(n) + f_o & 0 > C(n-1) + C'(n) \end{cases}$$

where:

$$C'(n) = \begin{cases} C'(n-1) + \Delta C(n) & 0 \le C'(n-1) + \Delta C(n) < f_o \\ C'(n-1) + \Delta C(n) - f_o & C'(n-1) + \Delta C(n) \ge f_o \\ C'(n-1) + \Delta C(n) + f_o & 0 > C'(n-1) + \Delta C(n) \end{cases}$$

Up-sampler 52 may also determine whether to set a carryover $\gamma_c(n)$ for the fractional phase C (64). If a value of fractional phase component C is greater or equal to an output frequency $f_o$ of up-sampler 52, carryover $\gamma_c(n)$ may be set to zero (66). If a value of fractional phase component C is less than an output frequency $f_o$ of up-sampler 52, $\gamma_c(n)$ may be set to a value of 1 or −1 (68). Setting $\gamma_c(n)$ to a value of 1 or −1 may indicate that $\gamma_c(n)$ is to be used to update integer phase component B. Similarly, as discussed above, up-sampler 52 may also determine whether to set a carryover $\gamma'_c(n)$ for fractional phase update C' when step size adjustment component ΔC has been asserted. The carryover values $\gamma_c(n)$ and $\gamma'_c(n)$ may be set according to the following equations:

$$\gamma_c(n) = \begin{cases} 0 & 0 \le C(n-1) + C'(n) < f_o \\ 1 & C(n-1) + C'(n) \ge f_o \\ -1 & C(n-1) + C'(n) < 0 \end{cases}$$

and:

$$\gamma'_c(n) = \begin{cases} 0 & 0 \le C'(n-1) + \Delta C(n) < f_o \\ 1 & C'(n-1) + \Delta C(n) \ge f_o \\ -1 & C'(n-1) + \Delta C(n) < 0 \end{cases}$$

Up-sampler 52 may also adjust or set an integer phase step size adjustment component ΔB (69). The integer phase step size adjustment component ΔB may represent an amount of phase by which integer phase component B is updated (via adjustment of step size value B') in operation. For example, a value of integer phase step size adjustment component ΔB may be added to or subtracted from a phase updated indicated by integer phase step size value B'. As shown in FIG. 7, up-sampler 52 may determine a value for integer phase step size adjustment component ΔB based on a detected clock rate mismatch from CRMD 65. A value for integer phase step size adjustment component ΔB may be determined such that a desired change in conversion rate is caused over an arbitrary number of iterative cycles of up-sampler 52. In one example, a value for integer phase step size adjustment component ΔB may be determined to cause a change in a single iterative cycle of up-sampler 52. In other examples, a value for integer phase step size adjustment component ΔB may be selected to cause a change over a series of iterative cycles of up-sampler 52. A value for integer phase step size adjustment component ΔB may be selected to minimize any detectable defects in playback.

Up-sampler 52 may further update integer phase component B. The update to the integer phase component B may include the incremental update specified by the integer phase step size value B', adjusted by a value specified by the integer phase step size adjustment component ΔB. The update to the integer phase component B may also include the carryover $\gamma_c(n)$, if $\gamma_c(n)$ was set to a value of 1 (or −1) at (68). In one example, the fraction phase component B may be updated according to the equation:

$$B(n) = \begin{cases} B(n-1) + B'(n) + \gamma_c(n) & 0 \le B(n-1) + B'(n) + \gamma_c(n) < N \\ B(n-1) + B'(n) + \gamma_c(n) - N & B(n-1) + B'(n) + \gamma_c(n) \ge N \\ B(n-1) + B'(n) + \gamma_c(n) + N & 0 > B(n-1) + B'(n) + \gamma_c(n) \end{cases}$$

where:

$$B'(n) = \begin{cases} B'(n-1) + \Delta B + \gamma'_c(n) & 0 \le B'(n-1) + \Delta B + \gamma'_c(n) < N \\ B'(n-1) + \Delta B + \gamma'_c(n) - N & B'(n-1) + \Delta B + \gamma'_c(n) \ge N \\ B'(n-1) + \Delta B + \gamma'_c(n) + N & 0 > B'(n-1) + \Delta B + \gamma'_c(n) \end{cases}$$

Up-sampler 52 may also determine whether to set a carryover $\gamma_b(n)$ for the integer phase component B (72). If a value of integer phase component B is less than N (the inverse of a bandwidth of anti-aliasing filter 26 as depicted in FIG. 6), carryover $\gamma_b(n)$ may be set to zero (74). If a value of integer phase component B is greater than or equal to N, $\gamma_b(n)$ may be set to a value of one (76). Setting $\gamma_b(n)$ to a value of 1 may indicate that $\gamma_b(n)$ is to be used to update input sample index A. Similarly, as discussed above, up-sampler 52 may also determine whether to set a carryover $\gamma'_b(n)$ for fractional phase update B' when step size adjustment component ΔC has been asserted. The carryover values $\gamma_b(n)$ and $\gamma'_b(n)$ may be set according to the following equations:

$$\gamma_b(n) = \begin{cases} 0 & 0 \le B(n-1) + B'(n) + \gamma_c(n) < N \\ 1 & B(n-1) + B'(n) + \gamma_c(n) \ge N \\ -1 & B(n-1) + B'(n) + \gamma_c(n) < 0 \end{cases}$$

$$\gamma'_b(n) = \begin{cases} 0 & 0 \le B'^{(n-1)} + \Delta B(n) + \gamma'_c(n) < N \\ 1 & B'(n-1) + \Delta B(n) + \gamma'_c(n) \ge N \\ -1 & B'(n-1) + \Delta B(n) + \gamma'_c(n) < 0 \end{cases}$$

Up-sampler 52 may also adjust or set an input sample index step size adjustment component ΔA (87). The input sample index step size adjustment component ΔA may represent an amount of phase by which input sample index component A is updated (via adjustment of step size value A') in operation. For example, a value of input sample index step size adjustment component ΔA may be added to or subtracted from a phase update indicated by size value A'. As shown in FIG. 7, up-sampler 52 may determine a value for input sample index step size adjustment component ΔA based on a detected clock rate mismatch from CRMD 65.

Up-sampler 52 may further update input sample index component A. The update to the input sample index component A may be adjusted by a value specified by the input sample index step size adjustment component ΔA. The update to the input sample index component A may also include the carryover $\gamma_b(n)$, if $\gamma_b(n)$ was set to a value of 1 at (86). In one example, the input sample index component A may be updated according to the equation:

$$A(n) = A(n-1) + A'(n-1) + \gamma b(n)$$

where:

$$A'(n) = A'(n-1) + \alpha A(n-1) + \gamma'_b(n)$$

As described above with respect to FIG. 7, each of components ΔA, ΔB, and ΔC 57 may be selected to cause a corresponding change in a conversion rate of up-sampler 52. As also described above, each of components B and C includes a carryover by which changes in corresponding components may affect an iterative update of other components. For example, if $\gamma_c(n)$ is set, $\gamma_c(n)$ may cause a corresponding change in a value for component B. Similarly, if $\gamma_b(n)$ is set, $\gamma_b(n)$ may cause a corresponding change in a value for component A. Furthermore, step size values B', and C' may include an associated carryover [γ']⊥b(n) and [γ']⊥c(n), respectively). As such, setting or adjusting a step size adjustment component ΔC may gradually cause a change in phase for component B that may eventually be propagated to cause a change in phase for component A. Thus, adjusting step size adjustment component ΔC may enable fine tuning of a conversion rate of up-sampler 52, while adjusting step size adjustment component ΔB may enable coarser tuning than step size adjustment component ΔC. Similarly, adjusting step size adjustment component ΔA may enable even coarser tuning of a conversion rate.

According to the techniques of this disclosure, one or more of step size adjustment components ΔA, ΔB, and ΔC 57 may be selectively set or adjusted in order to compensate for a detected clock rate mismatch between a local device clock 40 and a source clock 31 of a digital input signal. Accordingly, if a slight clock mismatch is detected, then up-sampler 52 may select a value for component ΔC. The value may be chosen such that only a small modification in output sample phase is caused per iterative cycle of up-sampler 52. The value may be chosen to reduce any defects in digital signal playback that would be caused by abrupt changes in the phase of output samples.

Figure 8:
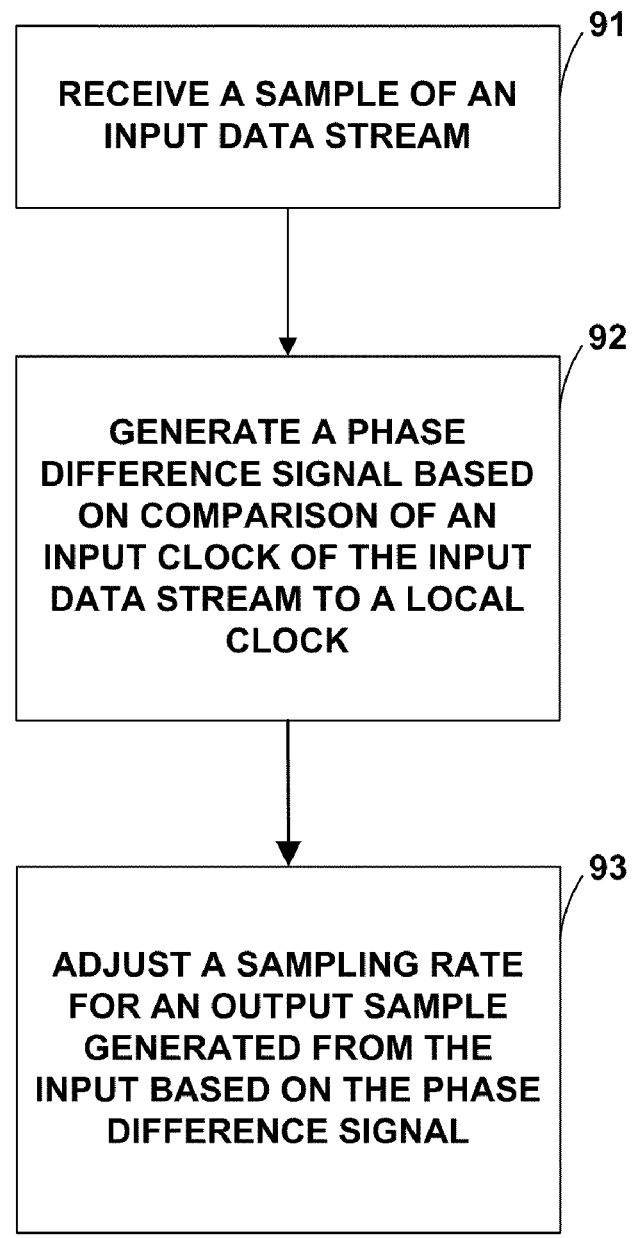
FIG. 8 is a flow chart diagram that illustrates one example of a method of converting a sampling rate in real-time consistent with this disclosure.

FIG. 8 illustrates one example of a method of converting a sampling rate of input signal at a conversion rate. The method includes receiving a sample of an input signal (91). The method further includes generating a phase difference signal based on comparison of a source clock 31 of the input signal to a local clock 40 (92). In one example, generating a phase difference signal includes comparing at least one received indication of the source clock 31 to the local clock to determine a clock rate mismatch. In another example, generating the phase difference signal includes monitoring an input buffer that receives samples of the input signal to estimate a clock rate mismatch. The method further includes adjusting the conversion rate of the input signal based on the phase difference signal (93). In one example, adjusting the conversion rate of the input signal is accomplished by setting or modifying one or more step size adjustment components 57 associated with one or more integer components 56 upon which relative timing of output samples is based.

Figure 9:
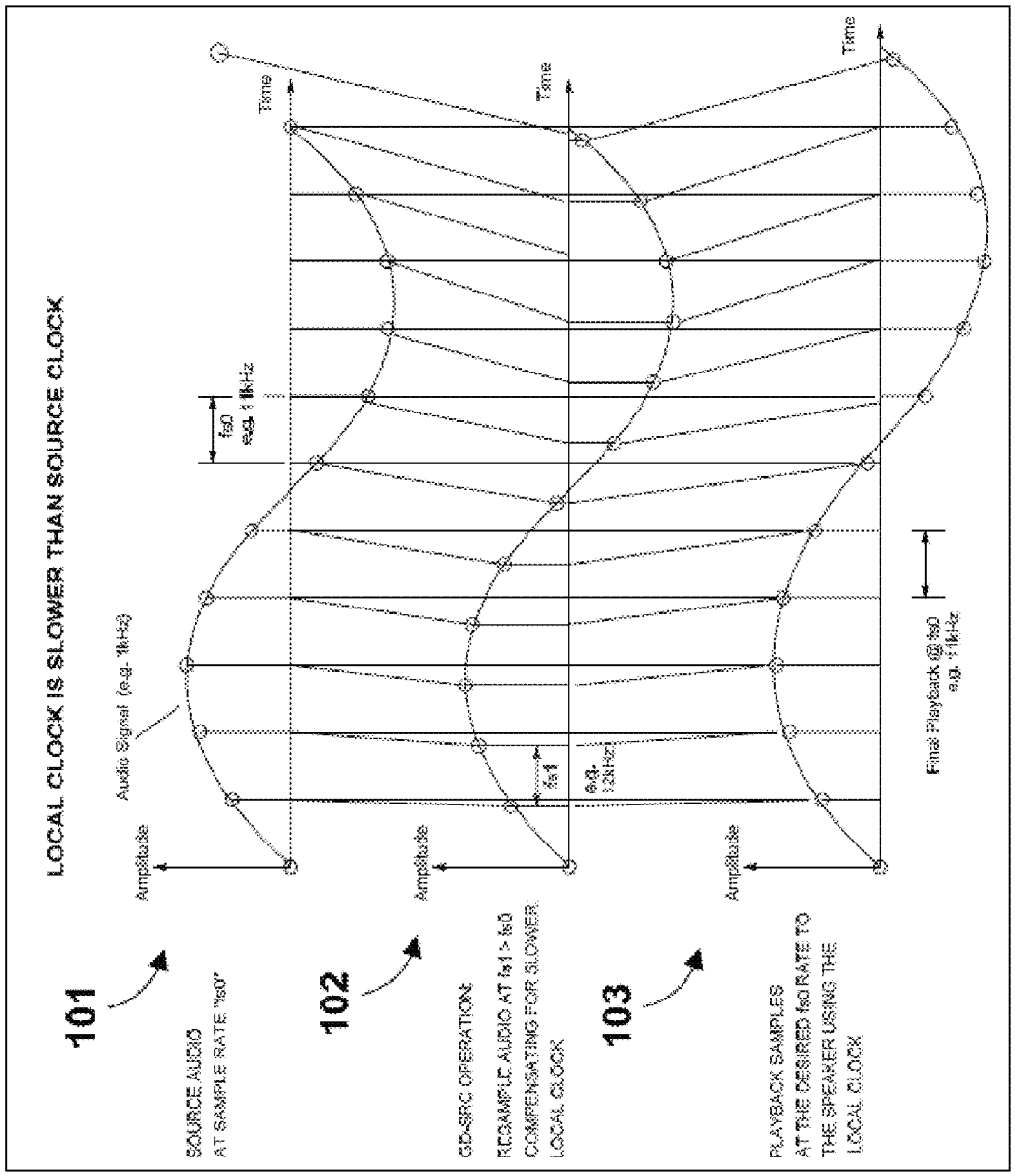
FIGS. 9 and 10 are conceptual diagrams depicting adjustment of a conversion rate of an input signal based on detected clock rate mismatch consistent with this disclosure.
Figure 10:
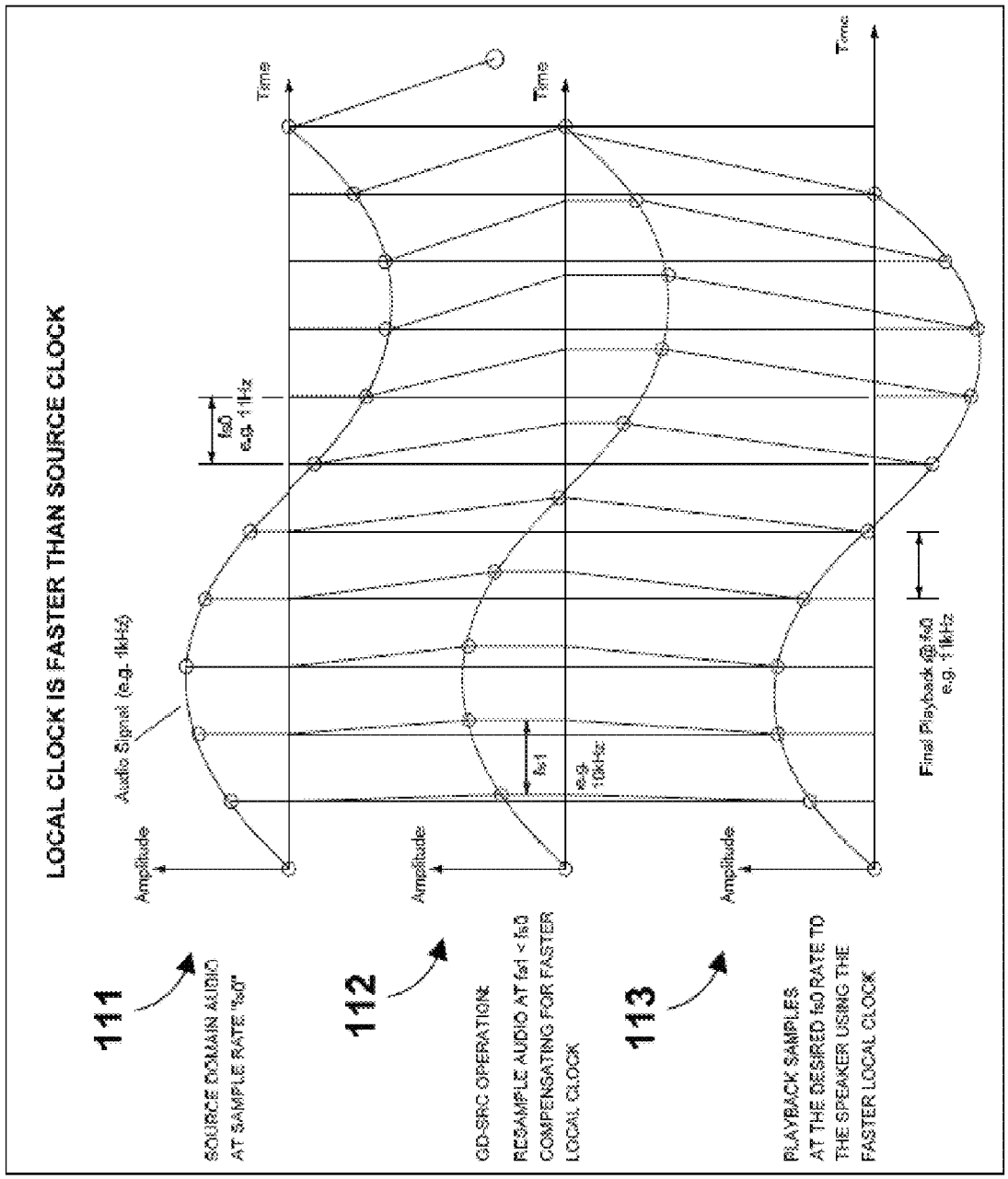

FIGS. 9 and 10 are conceptual diagrams that illustrate the adjustment of a conversion rate for the sample rate conversion of an input sample based on a detected mismatch between a local device clock and a source clock consistent with techniques described herein. FIG. 9 illustrates a scenario where a local clock has been determined to be slower than a source clock of an input signal. Plot 101 illustrates samples of the input signal at a sample rate $f_i$. Plot 102 illustrates operation of a sample rate converter to adjust a sampling rate of the input signal. Because the local clock is operating slower than the source clock, a timing of output samples may be sped up. Plot 103 shows playback of a sample rate converted signal. According to this example, because a conversion rate was modified based on detected clock rate mismatch, signal processing circuitry (e.g., an digital to analog converter DAC) may playback the output samples without significant error, because the signal processing circuitry is operating based on the local clock to which the conversion rate was synchronized.

FIG. 10 illustrates a scenario where a local clock has been determined to be faster than a source clock of an input signal. Plot 111 illustrates samples of the input signal at a sample rate $f_i$. Plot 112 illustrates operation of a sample rate converter to adjust a sampling rate of the input signal. Because the local clock is operating slower than the source clock, a timing of output samples may be sped up. Plot 113 shows playback of a sample rate converted signal. According to this example, because a conversion rate was modified based on a detected clock rate mismatch, signal processing circuitry (e.g., an digital to analog converter DAC) may playback the output samples without significant error, because the signal processing circuitry is operating based on the local clock to which the conversion rate was synchronized.

Tables 1A-1C, below, depict examples of real-time sampling rate transitions that may be achieved according to the techniques described herein. The first row of Table 1A depicts a sampling rate converter 52 as described herein configured to output samples at a sampling rate $f_o$ equal to a sampling rate of an input sampling rate $f_i$ of an input signal. The up-sampler 52 described with respect to Tables 1A-1C may include an anti-aliasing filter 28 with a bandwidth of $\pi/24$. As such, the value N as described herein is 24. Table 1A further shows values for integer components A, B, and C 56 as described herein. In addition, Table 1 shows a value D, which is a down conversion ratio of a down-sampler of a sampling rate converter. As shown in the first row of Table 1A, integer component A is set to a value of 1, indicating that for each generated output sample received, phase tracking module 30 increments input sample pointer A by a value of 1, to point to a next input sample. As also shown in Table 1A, phase tracking module 30 has set integer step size values B' and C' to a value of 0, indicating no phase increment is required with respect to input samples. In other words, because the conversion rate is equal to 1, an output sample is generated per input sample with the same timing as the input sample.

The second row of Table 1A depicts a circumstance where an input sampling rate of an input signal has changed during operation. In this example, the input sampling rate has changed only slightly, from 48000 Hz to 47999 Hz. The change in input sampling rate may indicate that clock rate mismatch detector 48 has detected a clock rate mismatch between an input clock and a local clock as described above.

According to the example shown in the second row of Table 1A, it may be desirable for phase tracking module 30 to change one or more step size values 58 for components A, B, and/or C 56 to cause a desired change in conversion rate. As shown in the second row of Table 1A, in light of the change in input sampling frequency $f_i$, it may be desirable for phase tracking module 30 to change to change the step size values 58 for components A, B, and C to the values 0, 23, and 47979, respectively. To do so, phase tracking module 30 may set or adjust a value of one or more of step size adjustment components $\Delta A$, $\Delta B$, and $\Delta C$ 57 to cause a change to components A, B, and C to the values depicted in the second row of Table 1A.

It may be desirable for phase tracking module 30 to change to values for components A, B, and C 56 gradually so as to minimize any audible defects in an output signal. In the example shown in row 1 of Table 1A, a change in input sampling rate from 48000 to 47999 is only a slight change. As such, it may be desirable to for phase tracking module 30 to change set only a step size adjustment value for component $\Delta C$. The update to component $\Delta C$ may propagate to component C, as well as components B and A as described above, resulting in a change in conversion rate of the up-sampler in real time. In one example, it may be desirable to maintain any transition in conversion rate below a threshold value, e.g., 1 Hz, to avoid audible defects in playback of an output signal of the sampling rate converter. Other threshold values for conversion rate transitions may apply, depending on the application.

In one example, as shown in the second row of Table 1B, to decrease a conversion rate, phase tracking module 30 may assign values $\Delta A=0$, $\Delta B=0$, and $\Delta C=-8$ to step size adjustment components 57. The value of $\Delta C$ may cause a slight change in a relative timing of output samples to compensate for a detected change in input frequency $f_i$ and/or a detected clock rate mismatch as described above. The value of $\Delta C$ in this case is chosen to be negative, to cause a decrease in the conversion rate. As shown in Table 1B (which corresponds to the example of Table 1A, row 2), phase tracking module 30 may assign a value of $-8$ to step size adjustment component $\Delta C$ for three consecutive sample generations, causing a progressive relative phase of an output sample to an intermediate sample indicated by component B from 0, to 47992, to 47984, and finally to a desired value of 47976 for component C. As shown in the fifth row of table 1B, after the desired value for component C has been reached (corresponding to the desired conversion rate), phase tracking module 30 may set a value for component $\Delta C$ to zero, because no further changes are needed in the conversion rate of the sampling rate converter.

Row 3 of Table 1A depicts an alternative scenario, where it is desired for phase tracking module 30 to modify an output sampling rate $f_o$. In one example, it may be desirable for phase tracking module 30 to change an output sampling rate based on a detected clock rate mismatch as described herein. As shown in row 3 of Table 1A, for phase tracking module 30 to change a sampling rate to correspond to a change in output sampling frequency, it may be desirable to change values for components A, B, and C 56 to 1, 0, and 24, respectively. To do so, phase tracking module 30 may assign values to one or more of step size adjustment components $\Delta A$, $\Delta B$, and $\Delta C$ 57. In one example, phase tracking module 30 may assign a values of $\Delta A=0$, $\Delta B=0$, and $\Delta C=8$ to step size adjustment components 57. According to this example, up-sampler 52 may adjust a conversion rate in light of the decrease in output sampling rate. Therefore, a positive value is assigned to update step size adjustment component ΔC. As shown in table 1C, phase tracking module 30 may assert a value of 8 for three consecutive output sample generation cycles, to progressively change a value for component C from 0, to 8, to 16, and finally to 24. For a fourth clock cycle as shown in Table 1C, phase tracking module 30 may assign a value of zero to step size adjustment component ΔC, because no further change is needed to the conversion rate.

TABLE 1A

| fi | fm | fo | D | N | A | B | C |
|---|---|---|---|---|---|---|---|
| 48000 | 48000 | 4800 | 1 | 24 | 1 | 0 | 0 |
| 47999 | 48000 | 48000 | 1 | 24 | 0 | 23 | 47976 |
| 48000 | 47999 | 47999 | 1 | 24 | 1 | 0 | 24 |

TABLE 1B

| A (1) | B (1) | C (1) | D | ΔC |
|---|---|---|---|---|
| 1 | 0 | 0 | 1 | 0 |
| 0 | 23 | 47992 | 1 | −8 |
| 0 | 23 | 47984 | 1 | −8 |
| 0 | 23 | 47976 | 1 | −8 |
| 0 | 23 | 47976 | 1 | 0 |

TABLE 1C

| A (1) | B (1) | C (1) | D | ΔC |
|---|---|---|---|---|
| 1 | 0 | 0 | 1 | 0 |
| 1 | 0 | 8 | 1 | 8 |
| 1 | 0 | 16 | 1 | 8 |
| 1 | 0 | 24 | 1 | 8 |
| 1 | 0 | 24 | 1 | 0 |

Tables 2A-2C below illustrate examples in which a up-sampler 52 as described herein is configured to provide a course adjustment to convert a sampling rate of an input signal, as well as a fine adjustment to a conversion rate in real time. As shown in row 1 of table 2A, up-sampler 52 may convert an input sampling rate of 44100 to an output sampling rate of 48000. As such, phase tracking module 30 may set integer components A, B, and C 56 to cause the coarse conversion. In the example of Table 2A, row 1, phase tracking module 30 may assign assigned the step size values 0, 22, and 2400 to integer components A, B, and C 56, respectively.

As shown in the second row of Table 2A, a change in output sampling rate may be desired. The desired change in output sampling rate may be based on clock rate mismatch detector 48 detection of a clock rate mismatch as described above. In the example of Table 2A, it is desired to increase an output sampling rate from a value of 48000 to a value of 48001. Thus, it may be desirable for phase tracking module 30 to change values of integer component C from 2400 to 2378.

In one example, as shown in the second row of Table 2B, phase tracking module 30 may assign the values of ΔA=0, ΔB=0, and ΔC=−11 to step size adjustment components 57. The value of ΔC=−11 may cause a slight change in a relative timing of output samples to compensate for a desired change in output sampling rate $f_o$. The value of ΔC in this case is chosen to be negative, to cause a decrease in a conversion rate of the sampling rate converter. As shown in Table 2B (which corresponds to the example of Table 2A, row 2), phase tracking module 30 may assign a value of −11 step size adjustment component ΔC for two consecutive output sample generations, causing a progressive relative phase of an output sample to an intermediate sample indicated by component B from 2400, to 2389, and finally to the desired value of 2378 for component C. As shown in the fourth row of table 2B, after the desired value for component C has been reached (corresponding to the desired conversion rate), phase tracking module 30 may set a value for step size adjustment component ΔC to zero, because no further changes are needed in the conversion rate of the sampling rate converter.

Row 3 of Table 2A depicts an alternative scenario, where it is desired to decrease an output sampling rate $f_o$. In one example, it may be desirable for phase tracking module 30 to decrease an output sampling rate based on a detection of a clock rate mismatch by clock rate mismatch detector 48 as described herein. As shown in row 3 of Table 2A, to change a sampling rate to correspond to a desired change in output sampling frequency, phase tracking module 30 may change values for components A, B, and C to 0, 22, and 2422, respectively. To do so, phase tracking module 30 may assign values to one or more of step size step size components ΔA, ΔB, and ΔC 57. In one example, as shown in Table 2C (which corresponds to the example of Table 2A, row 3), phase tracking module 30 may assign values of ΔA=0, ΔB=0, and ΔC=11 to step size adjustment components 57. Phase tracking module 30 may assert a value of 11 to component ΔC for two consecutive output sample generation cycles, to progressively change a value for component C from 2400, to 2411, and finally to 2422. For a fourth clock cycle as shown in Table 1C, phase tracking module 30 may assign step size adjustment component ΔC a value of zero, because no further change is needed to the conversion rate.

TABLE 2A

| fi | fm | fo | D | N | A | B | C |
|---|---|---|---|---|---|---|---|
| 44100 | 48000 | 48000 | 1 | 24 | 0 | 22 | 2400 |
| 44100 | 48001 | 48001 | 1 | 24 | 0 | 22 | 2378 |
| 44100 | 47999 | 47999 | 1 | 24 | 0 | 22 | 2422 |

TABLE 2B

| A (1) | B (1) | C (1) | D | ΔC |
|---|---|---|---|---|
| 0 | 22 | 2400 | 1 | 0 |
| 0 | 22 | 2389 | 1 | −11 |
| 0 | 22 | 2378 | 1 | −11 |
| 0 | 22 | 2378 | 1 | 0 |

TABLE 2C

| A (1) | B (1) | C (1) | D | ΔC |
|---|---|---|---|---|
| 1 | 0 | 2400 | 1 | 0 |
| 1 | 0 | 2411 | 1 | 11 |
| 1 | 0 | 2422 | 1 | 11 |
| 1 | 0 | 2422 | 1 | 0 |

The examples discussed above with respect to tables 1A-1C and 2A-2C show step size adjustment component ΔC asserted for two or more sequential iterations of up-sampler operation. In other examples not shown in tables 1A-1C and 2A-2C, one or more of step size adjustment components ΔA, ΔB, and/or ΔC may be updated iteratively, for example a value may be asserted to step size adjustment component ΔC for three iterations that are spaced apart from one another. For example, the adjustment to sample rate conversion rate described with respect to table 2B above could also be implemented by asserting the value −11 for a first iteration of output sample generation, and the value of −11 could be asserted again a number of samples later. Furthermore, although not depicted in tables 1A-1C and 2A-2C, any or all of step size adjustment components ΔA, ΔB, and/or ΔC 57 may be asserted as described herein to cause a change in conversion rate in real-time.

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various embodiments of the invention have been described. These and other embodiments are within the scope of the following claims.

The invention claimed is:

1. A method, comprising:
 receiving at least one input sample of an input signal;
 generating a phase difference signal based on comparison of a source clock of the input signal to a local clock, wherein the phase difference signal is generated by updating at least a fractional phase component of the comparison; and
 compensating for a detected clock rate mismatch indicated by the phase difference signal, wherein compensating for the detected clock mismatch includes adjusting a conversion rate of at least one output sample of a plurality of output samples based on the phase difference signal.

2. The method of claim 1, further comprising:
 adjusting the conversion rate of the at least one output sample of the plurality of output samples based on a detected change in an input sampling rate of the input signal.

3. The method of claim 1, further comprising:
 adjusting the conversion rate of the at least one output sample of the plurality of output samples based on a change in a desired output sampling rate.

4. The method of claim 1, wherein the output sample is a first output sample, the method further comprising:
 adjusting a conversion rate for at least one second output sample of the plurality of output samples based on the phase difference signal.

5. The method of claim 1, wherein compensating for the detected clock rate mismatch indicated by the phase difference signal includes adjusting the conversion rate of the plurality of samples to minimize audible defects in playback of an output signal comprising the plurality of output samples.

6. The method of claim 5, wherein adjusting the conversion rate of the plurality of samples to minimize audible defects in playback of the output signal comprising the plurality of output samples comprises adjusting the conversion rate less than 1 Hz per output sample of the plurality of output samples.

7. The method of claim 1, wherein generating the phase difference signal based on the comparison of a source clock of the input signal to a local clock comprises receiving at least one indication of a clock rate of the source clock.

8. The method of claim 1, wherein generating the phase difference signal based on the comparison of the source clock of the input signal to the local clock comprises monitoring at least one buffer.

9. The method of claim 8, wherein generating the phase difference signal comprises monitoring at least one input buffer.

10. The method of claim 8, wherein generating the phase difference signal comprises monitoring at least one output buffer.

11. The method of claim 1, wherein adjusting the conversion rate of the at least one output sample of the plurality of output samples includes setting or adjusting one or more step size components associated with one or more non-approximated integer values, wherein the non-approximated integer values represent a recursive update to timing of the at least one output sample.

12. The method of claim 1, wherein adjusting the conversion rate for the at least one output sample of the plurality of output samples comprises representing a relative timing between a desired output sample and a corresponding input sample of a digital signal based on a first component that identifies a latest input sample of the digital signal used to generate related intermediate samples, a second component that identifies an intermediate sample, and a third component that identifies a timing difference between a desired output sample and the intermediate sample.

13. The method of claim 10, further comprising:
wherein adjusting the conversion rate for the at least one output sample of the plurality of output samples includes setting or adjusting one or more step size components that indicate a timing adjustment for one or more of the first, second, and third components.

14. A sample rate converter, comprising:
an up-sampling module that converts a sampling rate of an input signal to an intermediate sampling rate;
a down-sampling module that converts a sampling rate of an intermediate signal to an output sampling rate;
a phase tracking module that determines a relative timing of output samples of an output signal, wherein the relative timing is determined by updating at least a fractional phase component representing a relative timing between the intermediate signal and a related output sample; and
a clock rate mismatch detector that determines a clock rate mismatch between a source clock of the input signal and a local clock, wherein the phase tracking module adjusts a conversion rate of at least one output sample of a plurality of output samples of the up-sampling module based on the clock rate mismatch.

15. The sample rate converter of claim 14, wherein the phase tracking module further adjusts the conversion rate of the at least one output sample of the plurality of output samples based on a detected change in an input sampling rate of the input signal.

16. The sample rate converter of claim 14, wherein the phase tracking module further adjusts the conversion rate of the at least one output sample of the plurality of output samples based on a change in a desired output sampling rate.

17. The sample rate converter of claim 14, wherein the input signal represents audio data, and wherein the phase tracking module adjusts a conversion rate of at least one output sample of a plurality of output samples so as to minimize audible defects in playback of the input signal.

18. The sample rate converter of claim 17, wherein the phase tracking module adjusts the conversion rate of the at least one output sample of the plurality of output samples less than 1 Hz per output sample to minimize audible defects in playback of the input signal.

19. The sample rate converter of claim 14, wherein the clock rate mismatch detector determines the clock rate mismatch between the source clock of the input signal and the local clock based on receiving at least one indication of a clock rate of the source clock.

20. The sample rate converter of claim 14, wherein the clock rate mismatch detector determines the clock rate mismatch between the source clock of the input signal and the local clock based on monitoring at least one buffer.

21. The sample rate converter of claim 14, wherein the phase tracking module adjusts the conversion rate of the at least one output sample of the plurality of output samples by setting or adjusting one or more step size components associated with one or more non-approximated integer values, wherein the non-approximated integer values represent a recursive update to timing of at least one output sample.

22. The sample rate converter of claim 14, wherein the phase tracking module represents a relative timing between a desired output sample and a corresponding input sample based on a first component that identifies a latest input sample of the digital signal used to generate related intermediate samples, a second component that identifies an intermediate sample, and a third component that identifies a timing difference between a desired output sample and the intermediate sample, wherein the third component is the fractional phase component.

23. The sample rate converter of claim 22, wherein the phase tracking module adjusts the conversion rate of the at least one output sample of the plurality of output samples based on setting or adjusting one or more step size components that indicate a timing adjustment for one or more of the first, second, and third components.

24. A non-transitory computer readable storage medium comprising instructions for causing a programmable processor to:
receive at least one input sample of an input signal;
generate a phase difference signal based on comparison of a source clock of the input signal to a local clock, wherein the phase difference signal is generated by updating at least a fractional phase component of the comparison; and
compensate for a detected clock rate mismatch indicated by the phase difference signal including adjusting a conversion rate of at least one output sample of a plurality of output samples based on the phase difference signal.

25. The non-transitory computer readable storage medium of claim 24, wherein the instructions further cause the programmable processor to:
adjust the conversion rate of the at least one output sample of the plurality of output samples based on a detected change in an input sampling rate of the input signal.

26. The non-transitory computer readable storage medium of claim 24, wherein the instructions further cause the programmable processor to:
adjust the conversion rate of the at least one output sample of the plurality of output samples based on a change in a desired output sampling rate.

27. The non-transitory computer readable storage medium of claim 24, wherein the instructions further cause the programmable processor to:
adjust a conversion rate for at least one second output sample of the plurality of output samples based on the phase difference signal.

28. The non-transitory computer readable storage medium of claim 24, wherein the instructions cause the programmable processor to:
adjust a conversion rate of a plurality of consecutive samples so as to minimize audible defects in playback of an output signal comprising the plurality of output samples.

29. The non-transitory computer readable storage medium of claim 28, wherein the instructions cause the programmable processor to:
adjust the conversion rate less than 1 Hz per output sample of the plurality of output samples.

30. The non-transitory computer readable storage medium of claim 24, wherein the instructions further cause the programmable processor to:
generate the phase difference signal based on receiving at least one indication of a clock rate of the source clock.

31. The non-transitory computer readable storage medium of claim 24, wherein the instructions further cause the programmable processor to:
generate the phase difference signal based on monitoring an input buffer.

32. The non-transitory computer readable storage medium of claim 24, wherein the instructions further cause the programmable processor to:

adjust the conversion rate of the at least one output sample of the plurality of output samples based on setting or adjusting one or more step size components associated with one or more non-approximated integer values, wherein the non-approximated integer values represent a recursive update to timing of the at least one output sample.

33. The non-transitory computer readable storage medium of claim 24, wherein the instructions further cause the programmable processor to:

adjust the conversion rate for the at least one output sample of the plurality of output samples based on representing a relative timing between a desired output sample and a corresponding input sample of a digital signal using a first component that identifies a latest input sample of the digital signal used to generate related intermediate samples, a second component that identifies an intermediate sample, and a third component that identifies a timing difference between a desired output sample and the intermediate sample.

34. The non-transitory computer readable storage medium of claim 33, wherein the instructions further cause the programmable processor to:

adjust the conversion rate for the at least one output sample of the plurality of output samples based on setting or adjusting one or more step size components that indicate a timing adjustment for one or more of the first, second, and third components.

35. A sample rate converter, comprising:

means for converting a sampling rate of an input signal to an intermediate sampling rate;

means for converting a sampling rate of an intermediate signal at the intermediate sampling rate to an output sampling rate;

means for determining a relative timing of output samples of an output signal, wherein the relative timing is determined by updating at least a fractional phase component representing a relative timing between the intermediate signal and a related output sample; and means for detecting a clock rate mismatch between a source clock of the input signal and a local clock, wherein the means for determining a relative timing of output samples of an output signal adjusts a conversion rate of at least one output sample of a plurality of output samples of the means for converting a sampling rate of an input signal to an intermediate sampling rate based on the clock rate mismatch.

36. The sample rate converter of claim 35, wherein means for determining a relative timing of output samples of an output signal further adjust the conversion rate of the at least one output sample of the plurality of output samples based on a detected change in an input sampling rate of the input signal.

37. The sample rate converter of claim 35, wherein the means for determining a relative timing of output samples of an output signal further adjust the conversion rate of the at least one output sample of the plurality of output samples based on a change in a desired output sampling rate.

38. The sample rate converter of claim 35, wherein the input signal represents audio data, and wherein the means for determining a relative timing of output samples of an output signal adjust the conversion rate of at least one output sample of a plurality of output samples so as to minimize audible defects in playback of the input signal.

39. The sample rate converter of claim 38, wherein the means for determining a relative timing of output samples of an output signal adjust the conversion rate of the at least one output sample of the plurality of output samples less than 1 Hz per output sample to minimize audible defects in playback of the input signal.

40. The sample rate converter of claim 35, wherein means for detecting a clock rate mismatch between a source clock of the input signal and a local clock determine the clock rate mismatch between the source clock of the input signal and the local clock based on receiving at least one indication of a clock rate of the source clock.

41. The sample rate converter of claim 35, wherein the means for detecting a clock rate mismatch between a source clock of the input signal and a local clock determine the clock rate mismatch between the source clock of the input signal and the local clock based on monitoring at least one buffer.

42. The sample rate converter of claim 35, wherein the means for determining a relative timing of output samples of an output signal adjust the conversion rate of the at least one output sample of the plurality of output samples by setting or adjusting one or more step size components associated with one or more non-approximated integer values, wherein the non-approximated integer values represent a recursive update to timing of at least one output sample.

43. The sample rate converter of claim 35, wherein means for determining a relative timing of output samples of an output signal represent a relative timing between a desired output sample and a corresponding input sample based on a first component that identifies a latest input sample of the digital signal used to generate related intermediate samples, a second component that identifies an intermediate sample, and a third component that identifies a timing difference between a desired output sample and the intermediate sample, wherein the third component is the fractional phase component.

44. The sample rate converter of claim 43, wherein the means for determining a relative timing of output samples of an output signal adjust the conversion rate of the at least one output sample of the plurality of output samples based on setting or adjusting one or more step size components that indicate a timing adjustment for one or more of the first, second, and third components.

45. A method of adjusting a conversion rate of an input signal from an input sampling rate to an output sampling rate, comprising:

determining at least one step size value for a plurality of non-approximated integer components that represent relative timing of output samples of an output signal based on timing of one or more input samples of the input signal;

incrementally updating the plurality of non-approximated integer components based on the at least one step size value, wherein at least one of the plurality of non-approximated integer components is based on a fractional component;

determining at least one step size adjustment component associated with the plurality of non-approximated integer components, wherein the at least one step size adjustment component identifies a desired adjustment to relative timing of output samples of the output signal; and adjusting a relative timing of at least one output sample of the output signal based on the at least one step size adjustment component.

46. The method of claim 45, wherein the input signal represents audio data, and wherein determining the at least one step size adjustment component includes determining the at least one step size component to minimize audible defects in playback of the input signal.

47. The method of claim 45, wherein determining at least one step size value for a plurality of non-approximated integer components comprises:
   determining a first step size value for a first component that identifies a latest input sample of the digital signal used to generate related intermediate samples;
   determining a second step size value for a second component that identifies an intermediate sample; and
   determining a third step size value for a third component that identifies a timing difference between a desired output sample and an intermediate sample, wherein the third component is the fractional component.

48. The method of claim 45, wherein determining at least one step size adjustment component includes determining based on a detected clock rate mismatch.

49. The method of claim 48, wherein the detected clock rate mismatch is between a local clock and a source clock of the input signal.

50. An up-sampler, comprising:
   a phase tracking module that determines at least one step size value for a plurality of non-approximated integer components that represent relative timing of output samples of the up-sampler based on timing of one or more input samples of an input signal;
   wherein the phase tracking module incrementally updates the plurality of non-approximated integer components based on the at least one step size value, wherein at least one of the plurality of non-approximated integer components is based on a fractional component;
   wherein the phase tracking module determines at least one step size adjustment component associated with the plurality of non-approximated integer components, wherein the at least one step size adjustment component identifies a desired adjustment to relative timing of output samples of the output signal; and
   wherein the phase tracking module adjusts a relative timing of at least one output sample of the output signal based on the at least one step size adjustment component.

51. The up-sampler of claim 50, wherein the input signal represents audio data, and wherein the phase tracking module determines the at least one step size adjustment component so as to minimize audible defects in playback of the input signal.

52. The up-sampler of claim 50, wherein the plurality of non-approximated integer components comprises:
   a first component that identifies a latest input sample of the digital signal used to generate related intermediate samples;
   a second component that identifies an intermediate sample; and
   a third component that identifies a timing difference between a desired output sample and an intermediate sample, wherein the third component is the fractional component.

53. The up-sampler of claim 50, wherein the phase tracking module determines the at least one step size adjustment component based on a detected clock rate mismatch.

54. The up-sampler of claim 53, wherein the detected clock rate mismatch is between a local clock and a source clock of the input signal.

55. An up-sampler, comprising:
   means for determining at least one step size value for a plurality of non-approximated integer components that represent relative timing of output samples of the up-sampler based on timing of one or more input samples of an input signal;
   means for incrementally updating the plurality of non-approximated integer components based on the at least one step size value, wherein at least one of the plurality of non-approximated integer components is based on a fractional component;
   means for determining at least one step size adjustment component associated with the plurality of non-approximated integer components, wherein the at least one step size adjustment component identifies a desired adjustment to relative timing of output samples of the output signal; and
   means for adjusting a relative timing of at least one output sample of the output signal based on the at least one step size adjustment component.

56. The up-sampler of claim 55, wherein the input signal represents audio data, and wherein the means for determining at least one step size adjustment component determine the at least one step size adjustment component so as to minimize audible defects in playback of the input signal.

57. The up-sampler of claim 55, wherein the plurality of non-approximated integer components comprises:
   a first component that identifies a latest input sample of the digital signal used to generate related intermediate samples;
   a second step size value for a second component that identifies an intermediate sample; and
   a third step size value for a third component that identifies a timing difference between a desired output sample and an intermediate sample, wherein the third component is the fractional component.

58. The up-sampler of claim 55, wherein the means for determining at least one step size adjustment component associated with the plurality of non-approximated integer components determine the at least one step size adjustment component based on a detected clock rate mismatch.

59. The up-sampler of claim 58, wherein the detected clock rate mismatch is between a local clock and a source clock of the input signal.

60. A non-transitory computer readable storage medium comprising instructions for causing a programmable processor to:
   determine at least one step size value for a plurality of non-approximated integer components that represent relative timing of output samples of an output signal based on timing of one or more input samples of the input signal;
   incrementally update the plurality of non-approximated integer components based on the at least one step size value, wherein at least one of the plurality of non-approximated integer components is based on a fractional component;
   determine at least one step size adjustment component associated with the plurality of non-approximated integer components, wherein the at least one step size adjustment component identifies a desired adjustment to relative timing of output samples of the output signal; and
   adjust a relative timing of at least one output sample of the output signal based on the at least one step size adjustment component.

61. The non-transitory computer readable storage medium of claim 60, wherein the input signal represents audio data, and wherein the computer readable storage medium comprises instructions cause the programmable processor to determine the at least one step size adjustment component so as to minimize audible defects in playback of the input signal.

62. The non-transitory computer readable storage medium of claim 60, wherein the plurality of non-approximated integer components comprise:
   a first component that identifies a latest input sample of the digital signal used to generate related intermediate samples;
   a second component that identifies an intermediate sample; and
   a third component that identifies a timing difference between a desired output sample and an intermediate sample, wherein the third component is the fractional component.

63. The non-transitory computer readable storage medium of claim 60, wherein the computer readable storage medium comprises instructions to cause the programmable processor to determine the at least one step size adjustment component based on a detected clock rate mismatch.

64. The non-transitory computer readable storage medium of claim 63, wherein the detected clock rate mismatch is between a local clock and a source clock of the input signal.

65. The method of claim 1, wherein the phase difference signal represents a relative timing between a desired output sample and a corresponding input sample based on a first component that identifies a latest input sample used to generate related intermediate samples, a second component that identifies an intermediate sample, and a third component that identifies a timing difference between a desired output sample and the intermediate sample, wherein the third component is the fractional phase component.

66. The non-transitory computer readable storage medium of claim 24, wherein the phase difference signal represents a relative timing between a desired output sample and a corresponding input sample based on a first component that identifies a latest input sample used to generate related intermediate samples, a second component that identifies an intermediate sample, and a third component that identifies a timing difference between a desired output sample and the intermediate sample, wherein the third component is the fractional phase component.

* * * * *